United States Patent [19]

Ichikawa et al.

[11] Patent Number: 4,976,149

[45] Date of Patent: Dec. 11, 1990

[54] ULTRASONIC DISTANCE SENSOR AND MONITORING OF SURFACE PROFILE UTILIZING ULTRASONIC DISTANCE SENSOR

[75] Inventors: Fumihiko Ichikawa; Toshio Ohki, both of Chiba, Japan

[73] Assignee: Kawasaki Steel Corporation, Hyogo, Japan

[21] Appl. No.: 364,573

[22] Filed: Jun. 8, 1989

Related U.S. Application Data

[63] Continuation of Ser. No. 827,954, Feb. 7, 1986, abandoned.

[30] Foreign Application Priority Data

Oct. 21, 1985 [JP] Japan .................. 60-233396

[51] Int. Cl.$^5$ .................................... G01N 29/00
[52] U.S. Cl. .................................... 73/597; 73/622; 73/644; 367/104; 367/902
[58] Field of Search .................. 73/597, 622, 625, 627, 73/629, 638, 641, 644, 1 DV, 626, 865.8; 367/13, 99, 103, 104, 902; 364/561, 562, 563

[56] References Cited

U.S. PATENT DOCUMENTS

| | | | |
|---|---|---|---|
| 3,184,969 | 5/1965 | Bolton . | |
| 3,548,642 | 12/1970 | Flaherty et al. | 73/625 |
| 3,745,833 | 7/1973 | Armstrong | 73/644 |
| 3,910,104 | 10/1975 | Davies | 73/641 |
| 3,944,963 | 3/1976 | Hively | 73/626 |
| 4,049,954 | 9/1977 | DaCosta Vieira et al. | 73/627 |
| 4,130,018 | 12/1978 | Adams et al. | 73/644 |
| 4,170,765 | 10/1979 | Austin et al. . | |
| 4,208,731 | 6/1980 | Desbrandes . | |
| 4,210,969 | 7/1980 | Massa | 367/902 |
| 4,254,660 | 3/1981 | Prause | 73/597 |
| 4,332,016 | 5/1982 | Berntsen | 367/103 |
| 4,561,064 | 12/1985 | Bruggen et al. | 364/561 |
| 4,569,037 | 2/1986 | Seiferling | 367/13 |

FOREIGN PATENT DOCUMENTS

| | | |
|---|---|---|
| 542762 | 5/1985 | Australia . |
| 2444222 | 7/1976 | Fed. Rep. of Germany . |
| 3209838 | 2/1982 | Fed. Rep. of Germany . |
| 3207950 | 9/1983 | Fed. Rep. of Germany . |
| 2379823 | 9/1978 | France . |
| 56-126781 | 10/1981 | Japan . |
| 57-84378 | 5/1982 | Japan . |
| 57-168108 | 10/1982 | Japan . |
| 61-97584 | 5/1986 | Japan . |
| 61-138108 | 6/1986 | Japan . |
| 570703 | 8/1977 | U.S.S.R. ................... 367/13 |
| 1573117 | 8/1980 | United Kingdom . |

OTHER PUBLICATIONS

Patent Abstracts of Japan, vol. 6, nr. 166 (P-138) (1044) Aug. 31, 1982.

J. G. Rumbold, "Ultrasonic Dimensional Tube Testing Techniques," Materials Evaluation, vol. 35, No. 2, Feb. 1977, pp. 45-50.

Patent Abstracts of Japan, vol. 10, nr. 274 (P-498)(2330), 9/18/86.

Patent Abstracts of Japan, vol. 6, nr. 2 (P-96)(880), 1/8/82.

Primary Examiner—John Chapman
Attorney, Agent, or Firm—Austin R. Miller

[57] ABSTRACT

An ultrasonic distance sensor generates ultrasonic waves and transmit same toward a target surface, the distance to which is to be measured, through a predetermined path. The sensor is also provided with a reference surface which reflects ultrasonic waves, which reference surface is disposed within the aforementioned predetermined path of the ultrasonic waves. A receiver associated with delayed pulse generators receives the ultrasonic waves reflected by the reference surface or by the target surface, selectively. Arithmetic operations based on the elapsed time between transmission of the ultrasonic waves and reception of the ultrasonic waves from the reference surface derive the transmission velocity of the ultrasonic wave based on the known distance to the reference surface. On the basis of the derived transmission velocity and the elapsed time measured with respect to the ultrasonic waves reflected by the target surface, the distance to the target surface is derived. The aforementioned ultrasonic sensor is used to monitor the external shape of an object. In order to monitor the external shape of the object, a system is composed of a plurality of the ultrasonic sensors. The sensors comprises a primary sensor or sensors directed toward the external surface of the object and an auxiliary sensor or sensors directed to a reference line.

57 Claims, 10 Drawing Sheets

ULTRASONIC DISTANCE SENSOR AND MONITORING OF SURFACE PROFILE UTILIZING ULTRASONIC DISTANCE SENSOR

This application is a continuation of U.S. patent application Ser. No. 826,954, filed 2/7/86, abandoned.

BACKGROUND OF THE INVENTION

The present invention relates generally to an ultrasonic distance sensor suitable for precise measurement of the distance to an object. More specifically, the invention relates to a distance sensor transmitting ultrasonic waves toward an object, receiving reflected ultrasonic waves and deriving the distance to the object based on an elapsed time between transmission of the ultrasonic waves and reception thereof. Further, the invention relates to application of the ultrasonic distance sensor to monitoring or scanning the surface profile of an object for detecting the external shape of the object. Such monitoring of the external shape of the object may be used to monitor the profile of a rolled product during rolling, for example.

In the steel industry and especially in rolling steel, ultrasonic distance sensors have been used for precise distance measurement or surface monitoring. In the known art, the ultrasonic waves are transmitted through a water tank or a water jet to an target surface to measure the distance by measuring the elapsed time between transmission and reception of the reflected ultrasonic waves. However, during transmission, water temperature variations tend to deviate the transmission time which causes errors in the measured distance to the target surface.

In order to eliminate the influence of the water temperature, it is necessary to correct the measured elapsed time or derived distance. This water temperature-dependent correction of the measured value was proposed in "Materials Evaluation" Vol. 35, No. 2, published in 1977, on pages 45 to 50. In the proposed system, an auxiliary sensor monitors the elapsed time to reception of an ultrasonic wave reflected by a reference surface which is located at a known distance from the auxiliary sensor. Based on the elapsed time measured by the auxiliary sensor, the transmission velocity of ultrasonic waves through the water is derived. The elapsed time measurement then utilizes the transmission velocity of the ultrasonic wave derived with respect to the reference surface. This proposed system helps improve the accuracy of the resultant measured distance.

However, the prior proposed system set forth above requires primary and auxiliary sensors for water temperature dependent correction, which increases the overall cost. Also, since the points of measurement of the primary and auxiliary sensors are separate, their water temperatures will tend to differ, so that the correction value will not necessarily be accurate. As is well known, the variation of transmission velocity of the ultrasonic waves relative to the water temperature is about $1.6 \times 10^{-3}/°$ C. This means when a temperature difference of 0.1° C. exists between the measurement points and the distance to be measured is about 30 mm., the error of the distance measurement will be about 5 $\mu$m. This error is unacceptably large for precise measurement of the distance.

Furthermore, the aforementioned known system utilizes a ramp wave and samples the ramp wave voltage upon reception of the reflected ultrasonic waves to measure the elapsed time. Accuracy of this system is limited to the linearity of the ramp wave and thus is rather low, at an error of about 0.1%. This means when the distance being measured is 30 mm., the error will be about 30 $\mu$m. The error due to the temperature difference between the two measuring points will be superimposed on the fundamental error set forth above.

In addition, various modern industries require highly accurate products, such as rollers for the rolling process and so forth. The foregoing conventional system is not able to satisfy the requirements for accuracy.

SUMMARY OF THE INVENTION

Therefore, it is an object of the present invention to provide an ultrasonic distance sensor which satisfies the requirements for accuracy of measurement.

Another object of the invention is to apply the ultrasonic sensor implementing the present invention to monitoring the external shape of an object.

In order to accomplish the aforementioned and other objects, an ultrasonic distance sensor, according to the present invention, generates ultrasonic waves and transmits same toward a target surface, the distance to which is to be measured, through a predetermined path. The sensor is also provided with a reference surface which reflects ultrasonic waves, which reference surface is disposed within the aforementioned predetermined path of the ultrasonic waves. A receiver associated with an enabling means receives the ultrasonic waves reflected by the reference surface or by the target surface, selectively. Arithmetic operations based on the elapsed time between transmission of the ultrasonic waves and reception of the ultrasonic waves from the reference surface derive the transmission velocity of the ultrasonic wave based on the known distance to the reference surface. On the basis of the derived transmission velocity and the elapsed time measured with respect to the ultrasonic waves reflected by the target surface, the distance to the target surface is derived.

According to the present invention, the aforementioned ultrasonic sensor is used to monitor the external shape of an object. In order to monitor the external shape of the object, a system is composed of a plurality of the ultrasonic sensors. The sensors comprises a primary sensor or sensors directed toward the external surface of the object and an auxiliary sensor or sensors directed to a reference line.

According to one aspect of the present invention, an ultrasonic sensor system for monitoring the distance to the surface of an object comprises a transmitter transmitting ultrasonic waves toward the surface at a first controlled timing along a predetermined path, a reflector member disposed within the path along which the ultrasonic wave is transmitted toward the target surface, the reflector member allowing some of the ultrasonic waves to pass toward the surface and reflecting the rest of the ultrasonic waves, and the reflector member being separated from the transmitter by a known distance, a receiver adapted to receive the ultrasonic waves reflected by the reflector member and by the surface and to produce a receiver signal when reflected ultrasonic waves are received, a timer means for measuring a first elapsed time from the first controlled timing to a second timing at which the reflected ultrasonic waves from the reflector member are received, and a second elapsed time from the first controlled timing to a third timing at which the reflected ultrasonic waves from the target surface are received, and a processor means for deriving the distance to the surface, based on the first and second elapsed times and the known distance to the reflector member, and deriving an output value indicative of the distance to the surface.

The transmitter and the receiver comprise a common oscillation member which generates ultrasonic waves to be transmitted to the target surface and oscillates in response to the ultrasonic waves reflected from the surface. The oscillation member is connected to a transmitter circuit adapted to drive the oscillation member at a given frequency at a controlled timing for generating the ultrasonic waves for transmission to the surface, and to a receiver circuit for detecting oscillation of the oscillation member and producing a receiver signal whenever oscillation of the oscillation member is detected.

The timer is responsive to the first receiver signal which is produced in response to driving of the oscillation member for transmitting ultrasonic waves and starting measurement of the elapsed time, to the second receiver signal to latch a first timer value serving as the first elapsed time indicative value, and to the third receiver signal to latch a second timer value serving as the second elapsed time indicative value. The processor means derives the velocity of sound on the basis of the first timer value and the known distance to the reflector member, and derives the distance to the surface on the basis of the sonic velocity derived with respect to the first timer value, and the second timer value.

The ultrasonic sensor further comprises a water jet nozzle connected to a water supply and adapted to discharge water toward the surface along the ultrasonic wave path.

The ultrasonic sensor further comprises a transmitter circuit producing a transmitter control signal ordering the transmitter to generate the ultrasonic waves to be transmitted to the surface at a controlled timing.

In the preferred embodiment, the timer means comprises a first timer for measuring the first elapsed time and a second timer for measuring the second elapsed time, and the first and second timers are responsive to the transmitter control signal to start measurement of the respective first and second elapsed times.

The ultrasonic sensor further comprises a first latch signal generator means associated with the first timer and responsive to reception of the reflected ultrasonic waves from the reflector means for generating a first latch signal for latching a timer value of the first timer, and a second latch signal generator means associated with the second timer and responsive to the reflected ultrasonic waves from the target surface for generating a second latch signal for latching a timer value of the second timer. The first latch signal generator means comprises a first delay circuit adapted to produce a first enabling signal having a given duration after a given first delay following the transmitter control signal, and a first latch signal generator responsive to reception of the reflected ultrasonic waves in the presence of the first enabling signal for generating the first latch signal, and wherein the second latch signal generator means comprises a second delay circuit adapted to produce a second enabling signal having a given duration after a given second delay following the transmitter control signal, and a second latch signal generator responsive to reception of the reflected ultrasonic wave under the presence of the second enabling signal for generating the second latch signal. The first delay approximately corresponds to the minimum elapsed time before reception of the reflected ultrasonic waves from the reflector member, and the second delay time approximately corresponds to the minimum elapsed time before reception of the reflected ultrasonic wave from the target surface.

In the alternative embodiment, the ultrasonic sensor further comprises a first delay circuit adapted to produce a first enabling signal having a given duration after a given first delay following the transmitter control signal, and a second delay circuit adapted to produce a second enabling signal having a given duration after a given second delay following the transmitter control signal. The first and second delay circuits are connected to the timer means via a switching circuit which is adapted to selectively pass one of the first and second enabling signals to the timer circuit, the timer being responsive to reception of the reflected ultrasonic waves in the presence of the first and second enabling signals to latch the first and second timer values representative of the first and second elapsed times, respectively.

According to another aspect of the invention, a process for measuring the distance to the surface of an object by utilizing ultrasonic waves, comprises the steps of:

defining a path through which the ultrasonic waves are transmitted toward and reflected back from the surface, providing a reflector member within the path, the reflector member allowing some of the ultrasonic waves to pass therethrough toward the surface and reflecting the rest of the ultrasonic waves, the reflector member being separated from the transmitter through a known distance.

transmitting ultrasonic waves toward the surface at a first controlled timing through a predetermined path, receiving the ultrasonic waves reflected by the reflector member and by the surface and producing a receiver signal when the reflected ultrasonic waves are received.

measuring a first elapsed time from the first controlled timing to a second timing at which the reflected ultrasonic waves from the reflector member are received, and a second elapsed time from the first controlled timing to a third timing at which the reflected ultrasonic waves from the surface are received, and deriving the distance to the surface, based on the first and second elapsed times and the known distance to the reflector member, and deriving an output value indicative of the distance to the surface.

In the preferred embodiment, the step of transmitting the ultrasonic wave is performed by driving the oscillation member at a given frequency at a controlled timing so as to generate the ultrasonic waves to be transmitted to the surface. The step of measuring the elapsed period is triggered in response to the first receiver signal produced in response to driving of the oscillation member for transmitting ultrasonic waves. The step of deriving distance includes a first step for deriving the velocity of sound on the basis of the first timer value and the known distance to the reflector member, and a second step of deriving the distance to the surface on the basis of the sonic velocity derived with respect to the first timer value, and the second timer value.

The process further comprises the step of generating a timing control signal for controlling the transmission timing of the ultrasonic waves to the surface through the ultrasonic wave path. The step of measuring elapsed time is triggered by the timing control signal.

According to a further aspect of the invention, the aforementioned ultrasonic sensor system is applicable for a system for monitoring the surface condition of an object, which comprises a base having a reference surface, a support means for supporting the object relative to the reference surface, a surface scanning means for transmitting ultrasonic waves towards various measuring points on the surface of the object and receiving the ultrasonic waves reflected from each of the measuring points on the surface of the object, and measuring the reflection elapsed time between transmission of the ultrasonic waves and reception of the reflected ultrasonic waves, and deriving a distance indicative value with respect to each of the measuring points, a first correction means for deriving the propagation velocity of the ultra-sonic waves and thus deriving a propagation-velocity-dependent first correction value, an arithmetic means for deriving the distance between each of the measuring points on the surface of the object and the scanning means, and a display unit adapted to display the results of monitoring of the surface condition of the object.

In the preferred embodiment of the aforementioned system, the first correction means comprises a reflector member disposed within the path through which the ultrasonic waves are transmitted, the reflector member allowing part of the ultrasonic waves to pass therethrough toward the target surface and reflecting the rest of the ultrasonic waves, and the reflector member being separated from the transmitter through a known distance, the timer means measuring a reference elapsed time between transmission of the ultrasonic waves and reception of the ultrasonic waves reflected by the reflector member, and the processor means deriving the propagation velocity of the ultrasonic waves based on the reference time and the known distance to the reflector member, and deriving the distance indicative value of each of the measuring points based on the propagation velocity and the reflection times.

The ultrasonic sensor is associated with a driving means which drives the sensor among the various measuring points on the surface of the object. The base movably accommodates the ultrasonic sensor. The driving means is associated with a position sensor which is adapted to detect the ultrasonic sensor position relative to the object for controlling positioning of the ultrasonic sensor.

The base accommodates the ultrasonic sensor within a chamber filled with a liquid ultrasonic wave transmission medium.

Preferably, the system further comprises a second correction means for detecting deflection of the base and deriving a second correction value for modifying the distance indicative value of the measuring point. The second correction means comprises an auxiliary ultrasonic sensor coupled with the surface scanning means, directed in a direction opposite to the direction of the surface scanning means and adapted to transmit ultrasonic waves toward a straight wire defining a reference line which lies essentially parallel to the reference surface under normal conditions. The straight wire is associated with a tensioning means constantly applying tension to the wire so as to hold the wire straight.

According to a still further aspect of the invention, a process for monitoring the surface condition of an object comprising the steps of:

defining a reference surface, positioning a scanning means which comprises an ultrasonic sensor transmitting ultrasonic waves toward the surface to be monitored and receiving ultrasonic waves reflected by the surface of the object.

providing a reference distance indicative member within the path of the ultrasonic waves which thereby reflects some of the transmitted ultrasonic waves, the reference distance indicative member being positioned at a predetermined distance from the scanning means, supporting the object such that the surface to be monitored opposes the reference surface at an roughly known separation, transmitting ultrasonic waves toward the surface of the object through the path, measuring a first elapsed time between transmission of the ultrasonic waves and reception of ultrasonic waves reflected by the reference distance indicative member, measuring a second elapsed time between transmission of the ultrasonic waves and reception of the ultrasonic waves reflected by the surface to be monitored, deriving the velocity of sound on the basis of the first elapsed time and the known distance to the reference distance indicative member, deriving the distance between the reference surface and the surface to be monitored on the basis of the sonic velocity and the second elapsed time, performing the preceding distance measurement steps at various measuring points on the surface of the object so as to establish numerous surface condition data, and displaying the resultant surface condition data on a display.

The process further comprises the step of driving the scanning means according to a predetermined scanning schedule and performing distance measurement at various measuring points on the scanning schedule.

The process further comprises a step of providing a linear member defining a substantially straight reference line relative to which deflection of the reference surface is monitored, providing an auxiliary ultrasonic sensor for transmitting auxiliary ultrasonic waves toward the reference line and receiving the ultrasonic waves reflected by the reference line defining member, measuring elapsed time between transmission of the auxiliary ultrasonic waves and reception of the reflected ultrasonic waves from the reference line defining member, deriving the distance between the reference surface and the reference line, deriving the deflection of the reference surface relative to the reference line on the basis of the derived distance, and modifying the surface condition data on the basis of the derived deflection.

According to a further aspect of the invention, a roller profile monitoring system comprises a movable base defining a reference surface and movable along its longitudinal axis within a predetermined travel range, a stationary support adapted to support the roller above the reference surface such that the roller axis lies parallel to the longitudinal axis of the movable base, a plurality of primary ultrasonic sensors mounted on the reference surface, each of the primary ultrasonic sensors transmitting ultrasonic waves toward a corresponding measuring point on the roller surface and receiving ultrasonic waves reflected by the roller surface at the measuring point, a substantially straight member lying essentially parallel to the longitudinal axis of the base and providing a substantially straight reference line with respect to which deflection of the reference surface is to be monitored, a plurality of auxiliary ultrasonic sensors coupled with respectively corresponding primary ultrasonic sensors, each transmitting ultrasonic waves toward the straight member and receiving the ultrasonic waves reflected by the straight member, a first timer means associated with each of the primary ultrasonic sensors, for measuring a first elapsed time between transmission of the ultrasonic waves from the primary ultrasonic sensor and reception of the reflected ultrasonic waves from the roller surface and producing a first elapsed time indicative signal, a second timer means associated with the auxiliary ultrasonic sensors for measuring a second elapsed time between transmission of the ultrasonic waves from the auxiliary ultrasonic sensor and reception of the reflected ultrasonic waves from the straight member and producing a second elapsed time indicative signal, an arithmetic means deriving the distances between the respective primary ultrasonic sensors and the corresponding measuring points on the roller surface on the basis of the first elapsed time indicative signals, detecting the deflection of the reference surface on the basis of the second elapsed time indicative signals, deriving correction values. modifying the derived distance based on the correction values and deriving roller profile indicative data, and a display means receiving the roller profile indicative data and displaying the received data on a display.

The primary ultrasonic sensors are arranged along the roller axis at predetermined regular intervals. The given travel range of the movable base approximately corresponding to the interval between the primary sensors.

In the preferred embodiment, the base comprises a hollow structure defining therein an internal space through which the straight member extends. The internal space is filled with water.

The roller profile monitoring system further comprises a position sensor for monitoring the axial position of the base and producing a base position indicative signal.

The arithmetic circuit is responsive to the base position indicative signal for arithmetically deriving the offset of the base relative to the roller in a direction perpendicular to the longitudinal axis and deriving a transverse shift dependent correction value for correcting the roller profile indicative data.

According to a still further aspect of the invention, a process for monitoring a profile of a roller comprising the steps of:

defining a reference surface, positioning a scanning means which comprises an ultrasonic sensor transmitting ultrasonic waves toward the surface to be monitored and receiving ultrasonic waves reflected by the surface of the roller, providing a reference distance indicative member within the path of the ultrasonic waves which thereby reflects some of the transmitted ultrasonic waves, the reference distance indicative member being positioned at a predetermined distance from the scanning means, supporting the roller such that the surface to be monitored opposes the reference surface at an roughly known separation, transmitting ultrasonic waves toward the surface of the roller through the path, measuring a first elapsed time between transmission of the ultrasonic waves and reception of the ultrasonic waves reflected by the reference distance indicative member, measuring a second elapsed time between transmission of the ultrasonic waves and reception of the ultrasonic waves reflected by the surface to be monitored.

deriving the velocity of sound on the basis of the first elapsed time and the known distance to the reference distance indicative member, deriving the distance between the reference surface and the surface to be monitored on the basis of the sonic velocity and the second elapsed time, driving the scanning means at a predetermined timing and at a given velocity among various measuring points, performing the preceding distance measurement steps at the various measuring points on the surface of the roller so as to establish numerous surface condition data, and displaying the resultant surface condition data on a display.

The process further comprises a step of providing a linear member forming the reference distance indicative member relative to which deflection of the reference surface is monitored, providing an auxiliary ultrasonic sensor for transmitting auxiliary ultrasonic waves toward the reference line and receiving the ultrasonic waves reflected by the reference line defining member, measuring elapsed time between transmission of the auxiliary ultrasonic waves and reception of the reflected ultrasonic waves from the reference line defining member, deriving the distance between the reference surface and the reference line, deriving the deflection of the reference surface relative to the reference line on the basis of the derived distance, and modifying the surface condition data on the basis of the derived deflection.

The step for driving the scanning means among various measuring points is formed to shift the scanning means within a distance approximately corresponding to an interval of the scanning means, and the driving step is performed by causing axial displacement of the reference surface together with the scanning means.

Preferably, the process further comprises a step for correcting derived distance between the reference surface and the surface of the roller for compensating displacement of the reference surface according to the axial displacement thereof.

The corrected distance $Z_i(L)$ at the fully shifted position is derived by the equation $$Z'_i(L) = Z_i(L) + a_1 \times i + b_1$$

where coefficients a and b are derived so as to minimize $\Delta$, defined in the following equation:

$$\Delta = \sum_{i=1}^{9} \{Z'_i(L) - Z_{i+1}(0)\}^2$$

where $Z_i(0)$ ($i = 1$ to $10$) are the measured values at the initial positions. The corrected roller profile indicative distance values $W_i$ at any of the intermediate points shifted through a distance l is derived by modifying the distance value $Z_i(l)$ ($i = 1, 2, \ldots, 10$) according to the following equation:

$$W_i = Z_i(l) + a_2 \times i + b_2$$

where $$a_2 = \frac{1}{9} \left\{ -Z_{10}(l) + Z_1(l) + \frac{Q'_9}{2L^2} l(l-L) - \right.$$

-continued $$\frac{Q'_{10}}{L^2}(l+L)(l-L) - \frac{Q'_3}{2L^2}l(l-L) + \frac{Q'_2}{L^2}l(l-2L)\Bigg\}$$

$$b_2 = \frac{1}{9}\Bigg\{-10Z_1(l) + Z_{10}(l) + \frac{5Q'_3}{L^2}l(l-L) -$$

$$\frac{10Q'_2}{L^2}l(l-2L) - \frac{Q'_9}{2L^2}l(l-L) + \frac{Q'_{10}}{L^2}(l+L)(l-L)\Bigg\}$$

$Q_i$ (shown in FIG. 15) (i=1 to 11) being derived from the following equation:

$$Q_i = Z_i(0): i = 1$$
$$= \{Z'_{i-1}(L) + Z_i(0)\}/2: i = 2\text{-}10$$
$$= Z'_{10}(L): i = 11$$

$Q'_i$ (i=1 to 11) being derived from the following equation:

$$Q'_i = Q_i = -(Q_{11}-Q_1)/10 + Q_1 \times.$$

BRIEF DESCRIPTION OF THE DRAWINGS

The present invention will be understood from the detailed description given herebelow and from the accompanying drawings of the preferred embodiment of the invention, which, however, should not be taken to limit the invention to the specific embodiments, but are for explanation and understanding only.

In the drawings.

DESCRIPTION OF THE PREFERRED EMBODIMENT

Figure 1:
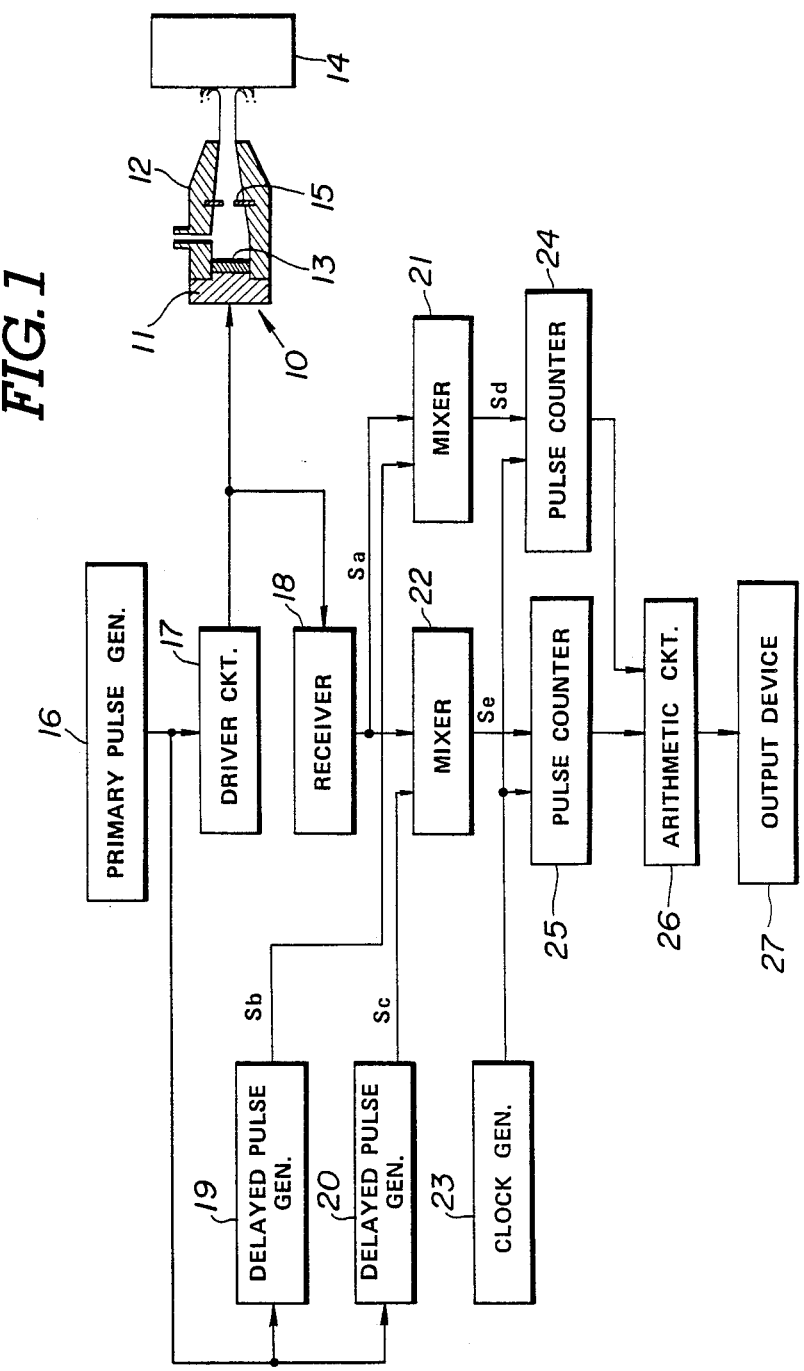
FIG. 1 is a block diagram of the preferred embodiment of an ultrasonic sensor system according to the present invention.
Figure 2:
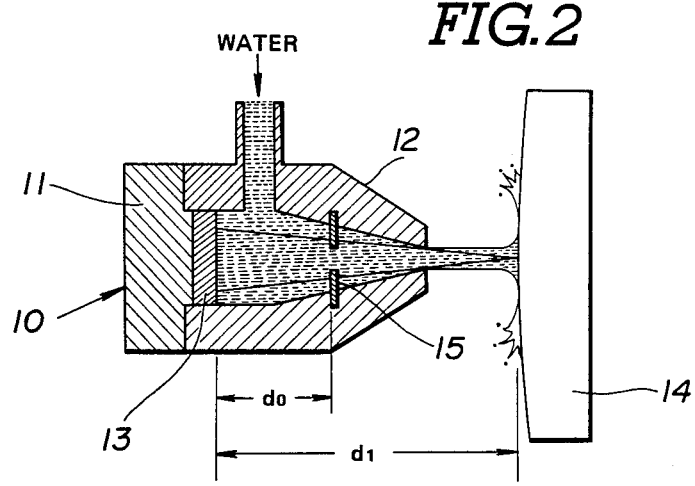
FIG. 2 is an enlarged section through a sensor head in the preferred embodiment of the ultrasonic sensor system of FIG. 1.

Referring now to the drawings, particularly to FIGS. 1 and 2, the preferred embodiment of an ultrasonic sensor system according to the present invention measures the elapsed time between transmission of ultrasonic waves and reception of an ultrasonic waves reflected by a surface of an object, to which the distance is to be measured. The ultrasonic waves transmitted by the sensor system to the target surface will be hereafter referred to as "transmitted waves" and the ultrasonic waves reflected by the target surface will be hereafter referred to as "reflected waves". In the shown embodiment, the transmitted waves and the reflected waves pass through a fluid stream, such as a water jet. The path for the ultrasonic waves defined by the fluid stream will be hereafter referred to as "ultrasonic wave path".

It should be appreciated that, although the shown embodiment employs a water jet to form the ultrasonic wave path, other appropriate fluids, such as oil, air and so forth may be the medium for the ultrasonic wave.

Referring to FIGS. 1 and 2, the preferred embodiment of the ultrasonic sensor system, according to the present invention, has a sensor head 11. The sensor head 11 is provided with a water jet nozzle 12 for discharging a water jet. The water jet nozzle 12 has a port a connected to a water supply circuit (not shown), through which pressurized water is supplied. A vibrator 13 which is designed to oscillate at ultrasonic frequencies produces the transmitted wave and resonates when the reflected wave is received.

The vibrator 13 is placed at a given distance from the surface of an object 14, the distance $d_1$ to which is to be measured, as shown in FIG. 2. The surface of the object to be monitored will be hereafter referred to as "target surface". The water jet is directed toward the target surface to form the ultrasonic wave path.

An annular reflector plate is disposed within the ultrasonic wave path. The reflector plate 15 is separated from the vibrator 13 by a predetermined distance $d_0$. The reflector plate 15 is made of essentially disc-shaped metal plate with a central circular opening having a diameter $\phi_1$ slightly smaller than the diameter $\phi_0$ of the ultrasonic beam. Therefore, the edge of the central opening of the reflector plate 15 extends into the path of the ultrasonic beam and reflects part of the ultrasonic beam. The rest of the ultrasonic beam from the vibrator 13 passes through the central opening of the reflector plate 15 and reaches the target surface. As will be appreciated from FIG. 1 and 2, the reflector plate 15 is closer to the vibrator 13 than the target surface.

In order to generate the ultrasonic waves, the vibrator 13 is associated with a driver circuit 17, which is, in turn, connected for input from a primary pulse generator 16. The driver circuit 17 receives a primary pulse from the primary pulse generator 16 and outputs a drive signal $P_a$ to the vibrator 13. The drive signal $P_a$ has a frequency substantially corresponding to the frequency of the primary pulse and to the desired oscillation or vibration frequency of the vibrator 13. In other words, the vibrator 13 is driven at an ultrasonic frequency in synchronism with the primary pulse. The vibrator 13 is, on the other hand, connected for output to a receiver 18 to which it sends a vibration indicative signal when it resonates in response to a reflected wave. Although it is not shown in the drawings, the receiver 18 is provided with an amplifier to amplify the received vibration indicative signal and transmits the amplified signal to mixers 21 and 22.

The mixers 21 and 22 are also connected for input from delayed pulse generators 19 and 20, which are, in turn, connected for input from the primary pulse generator 16. The delayed pulse generators 19 and 20 produce delayed pulses $S_b$ and $S_c$ with respectively predetermined delay times relative to the primary pulse. The delayed pulse generator 19 produces a delay approximately corresponding to the expected elapsed time between transmission of the ultrasonic waves by the vibrator 13 and reception of the ultrasonic waves reflected by the reflector plate 15. The elapsed time between transmission of the ultrasonic waves by the vibrator 13 and reception of the ultrasonic waves reflected from the reflector plate 15 will be referred to hereafter as "reference time". The delayed pulse $P_b$ from the delayed pulse generator 19 has a pulse width wide enough to cover all possible reference times. On the other hand, the delayed pulse generator 20 produces a delay approximately corresponding to an elapsed time between transmission of the transmitted waves and reception of waves reflected by the target surface. The elapsed time between transmission of the transmitted wave and receipt of the reflected wave will be hereafter referred to as "reflection time". The pulse width of the delayed pulse $P_c$ from the delayed pulse generator 20 is selected to be wide enough to cover all possible reflection times.

The mixer 21 receives the delayed pulse $S_b$ and is responsive to the vibration indicative signal from the receiver 18 in the presence of the delayed pulse $S_b$ from the delayed pulse generator 19, to produce a mixer signal $S_d$. Similarly, the mixer 22 receives the delayed pulse $S_c$ is responsive to the vibration indicative signal from the receiver 18 in the presence of the delayed pulse $S_c$ from the delayed pulse generator 20, to produce a mixer signal $S_e$. The mixer signal from the mixer 21 is fed to a pulse counter 24. The pulse counter 24 is connected to a clock generator 23 to receive clock pulses and counts the latter. The pulse counter 24 is responsive to the mixer signal $S_d$ to latch its counter value and to send a reference time indicative signal which is representative of the reference time. Similarly, the mixer signal from the mixer 22 is fed to a pulse counter 25. The pulse counter 25 is also connected to a clock generator 23 to receive clock pulses and counts the latter. The pulse counter 25 is responsive to the mixer signal $S_e$ to latch its counter value and to output a reflection time indicative signal which is representative of the reflection time.

An arithmetic circuit 26 receives the reference time indicative signal from the pulse counter 24 and the reflection time indicative signal from the pulse counter 25. The arithmetic circuit 26 processes the reference time indicative signal to derive the transmission velocity of ultrasonic waves through the water jet on the basis of the known distance $d_0$ between the vibrator 13 and the reflector plate 15 and reference time indicative signal value. The reflection time indicative signal is processed on the basis of the derived transmission velocity to derive the distance $d_1$ between the vibrator 13 and the target surface. The arithmetic circuit 26 thus derives an output signal having a value representative of the derived distance $d_1$.

Figure 3:
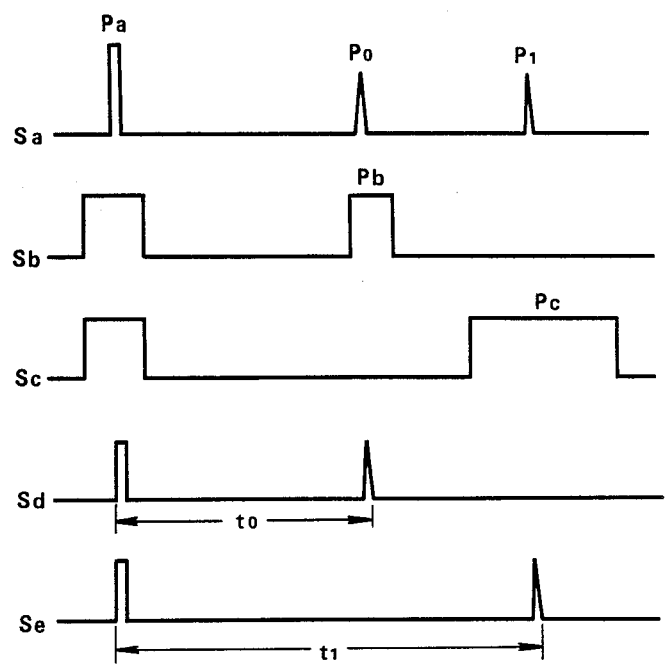
FIG. 3 is a timing chart of operation of the preferred embodiment of the ultrasonic sensor system of FIG. 1.

FIG. 3 shows the timing chart showing operation of the ultrasonic sensor system as set forth above. In the operation, both of the delayed pulse generators 19 and 20 are triggered by the primary pulse generator before the driver circuit 17. Thus, both of the delayed pulse generators 19 and 20 output the delayed pulses $S_b$ and $S_c$ with the predetermined pulse widths. In the presence of both of the delayed pulses $S_b$ and $S_c$, the driver circuit 17 outputs the driver signal $S_a$. The driver signal $S_a$ is output to the vibrator 13 to drive the latter and to the receiver 18. The receiver 18 outputs a vibration indicative signal to the mixers 21 and 22. Therefore, the mixers 21 and 22 transmit signals $S_d$ and $S_e$ substantially corresponding to the signal received by the receiver 18 to the corresponding pulse counters 24 and 25. The pulse counters 24 and 25 are triggered by the signals $S_d$ and $S_e$ from the mixers 21 and 22 to start counting clock pulses.

After a given delay following the primary pulse, the delayed pulse generator 19 again outputs the delayed pulse $S_b$ ($P_b$). As set forth above, this delay approximately corresponds to the reference time. Shortly after the rising edge of the delayed pulse $S_b$ ($P_b$), the vibrator 13 will be driven to vibrate by the ultrasonic waves reflected by the reflector plate 15. Due to the presence of the delayed pulse $S_b$ ($P_b$) from the delayed pulse generator 19, the mixer 21 produces the mixer signal $S_d$. The pulse counter 24 is responsive to the mixer signal $S_d$ from the mixer 21 to latch its counter value and output the reference time indicative signal to the arithmetic circuit 26. The value of the reference time indicative signal corresponds to the counter value of the pulse counter 24 and, in addition, is representative of the reference time.

After a given delay following the primary pulse, the delayed pulse generator 20 again outputs the delayed pulse $S_c$ ($P_c$). As set forth above, this delay approximately corresponds to the reflection time. Shortly after the rising edge of the delayed pulse $S_c$ ($P_c$), the vibrator 13 is driven to vibrate by the ultrasonic waves reflected from the surface of an object 14. Due to the presence of the delayed pulse $S_c$ ($P_c$) from the delayed pulse generator 20, the mixer produce the mixer signal $S_e$. The pulse counter 25 is responsive to the mixer signal $S_e$ from the mixer 22 to latch its counter value and output the reflection time indicative signal to the arithmetic circuit 26. The value of the reflection time indicative signal corresponds to the counter value of the pulse counter 25 which, in turn, is representative of the reflection time.

The arithmetic circuit 26 derives the transmission velocity C of the ultrasonic wave through the water jet according to the following equation (2). in terms of the reference time $T_0$ measured with respect to the ultrasonic wave reflected by the reflector plate 15, and the known distance $d_0$ between the reflector plate 15 and the vibrator 13:

$C = d_0/(T_0 - \Delta)$ ... (2)

where $\Delta$ is a relatively short elapsed time required for transmission of the primary pulse and/or the drive signal to the vibrator through a conductive line and so on.

Based on the transmission velocity C derived according to the equation (2), the distance $d_1$ from the vibrator 13 to the target surface is derived by the equation (3) in terms of the reflection time $T_1$:

$$d_1 = (T_1 - \Delta) \times C \ldots (3)$$

The arithmetic circuit 26 outputs an output signal based on the derived distance $d_1$ through an output device 27.

It should be noted that the primary pulse generator 16 produces a primary pulse with a 20-nsec rising transition. The vibrator 13 employed in the shown embodiment operates at a vibration frequency of approximately 10 MHz. On the other hand, the clock generator 23 employed in the shown embodiment produces clock pulses at 1 GHz. In general, the transmission velocity of the ultrasonic waves through the water is approximately 1.500 m/sec. Therefore, by utilizing a clock frequency of 1 GHZ, the system will have a resolution of better than 1 $\mu$m. This allows precise measurement of the distance to the target surface.

According to the shown embodiment, since the reflector plate 15 is provided within the ultrasonic wave path through which the waves from the vibrator are transmitted, the reference time is measured at substantially the same water temperature. This satisfactorily prevents error in the velocity of sound in water due to temperature differences. In addition, by deriving the sonic velocity based on the known distance and the reference time, errors which would otherwise occur due to use of a constant or fixed sonic velocity value can be avoided.

Figure 4:
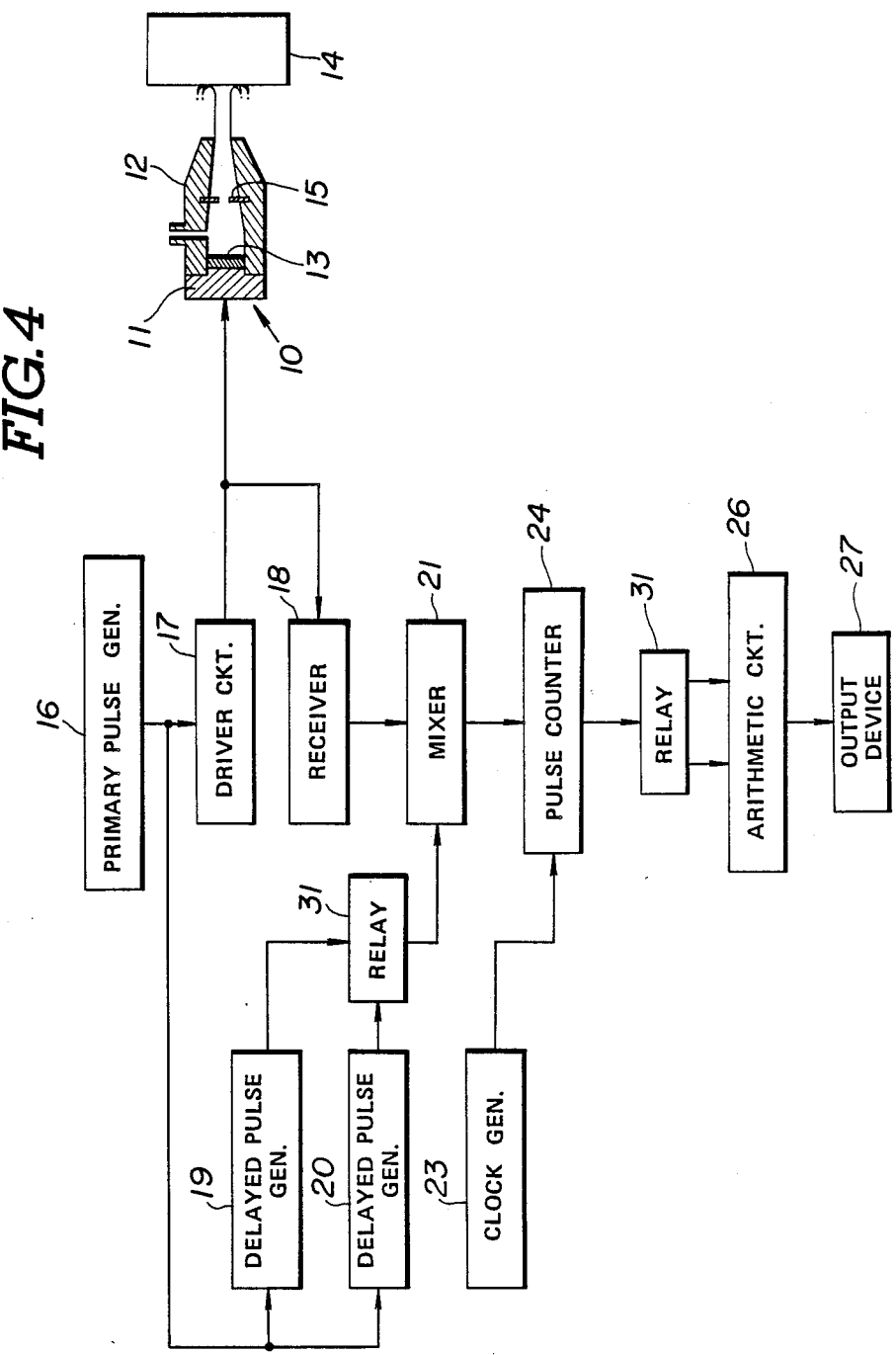
FIG. 4 is a block diagram of a modified embodiment of an ultrasonic sensor system according to the present invention.

FIG. 4 shows a modification of the preferred embodiment of an ultrasonic sensor, according to the invention. In this modification the mixer 21 and the pulse counter 24 are commonly used for measurement of the reference time and the reflection time. In this embodiment, the mixer 21 is commonly connected for input from the delayed pulse generators 19 and 20 through a switching relay 31. The switching relay 31 selectively connects one of the delayed pulse generators 19 and 20 to the mixer 21 to transmit the delayed pulse from the corresponding one of the delayed pulse generators.

According to this modification, two cycles of transmission of the ultrasonic waves, reception of the reflected ultrasonic waves, and measure of elapsed time between transmission and reception of the ultrasonic waves are performed to measure both the reference time and reflection time. Specifically, in the first cycle, the mixer 21 is connected to the delayed pulse generator 19 to receive the delayed pulse therefrom. This enables the mixer 21 to respond to the vibration indicative signal produced upon reception of the ultrasonic wave reflected by the reflector plate 15. Thus, the reference time can be measured according to substantially the same procedure as set out with respect to the foregoing preferred embodiment. Then, in the second cycle, the switching relay 31 is switched to connect the mixer 21 to the delayed pulse generator 20. As a result, the mixer 21 is enabled to respond to the reflected wave received by the vibrator 13. Therefore, in the second cycle, the reflection time can be measured by latching the counter value of the pulse counter 24 upon reception of the vibration indicative signal from the receiver 18.

The arithmetic circuit 26 thus derives the sonic velocity C through the water based on the result of measurement in the first cycle, and the distance $d_1$ to the target surface based on the derived sonic velocity C and the reflection time measured in the second cycle.

This modification simplifies the structure of the ultrasonic sensor system by eliminating the mixer 22 and the pulse counter 25. This also serves to reduce the cost of construction of the ultrasonic sensor system.

Figure 5:
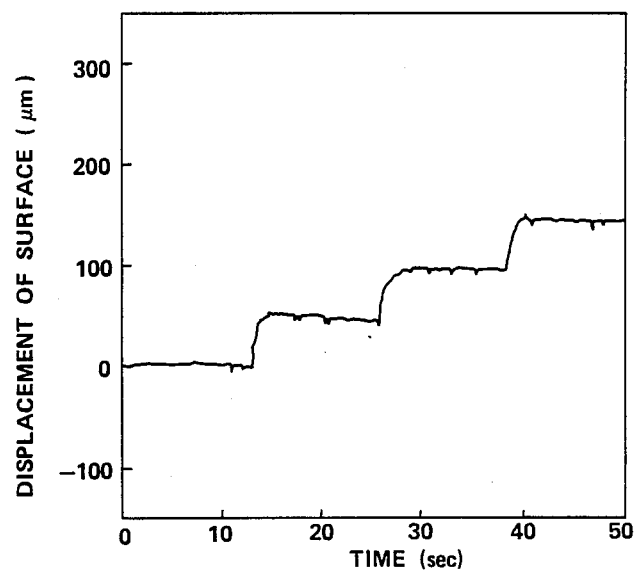
FIG. 5 is a graph of output of the sensor system of FIGS. 1 and 4.

FIG. 5 shows practical results of measurement of the distance to the target surface, in which the target surface is offset step-by-step by 50 $\mu$m. As will be seen from FIG. 5, according to the preferred embodiment of the ultrasonic sensor system according to the invention, error of measurement is $\pm 2$ $\mu$m. This proves that precise measurement of the distance to the target surface is possible with the present invention.

Figure 6:
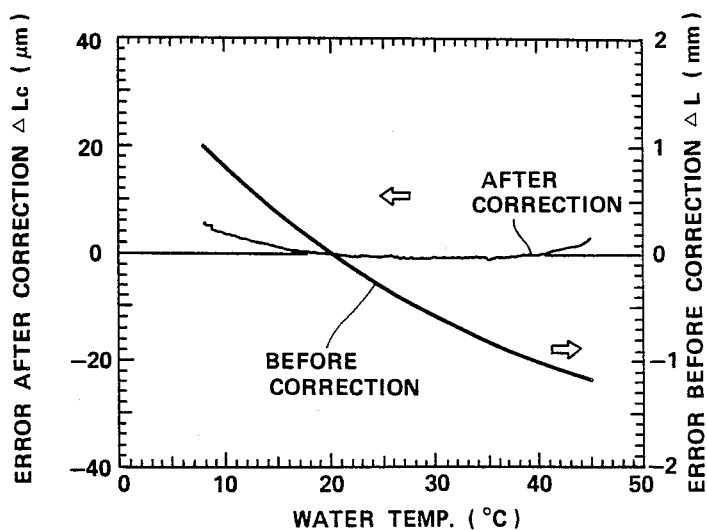
FIG. 6 is a comparatory graph illustrating the effects of the ultrasonic sensor system according to the invention.
Figure 7:
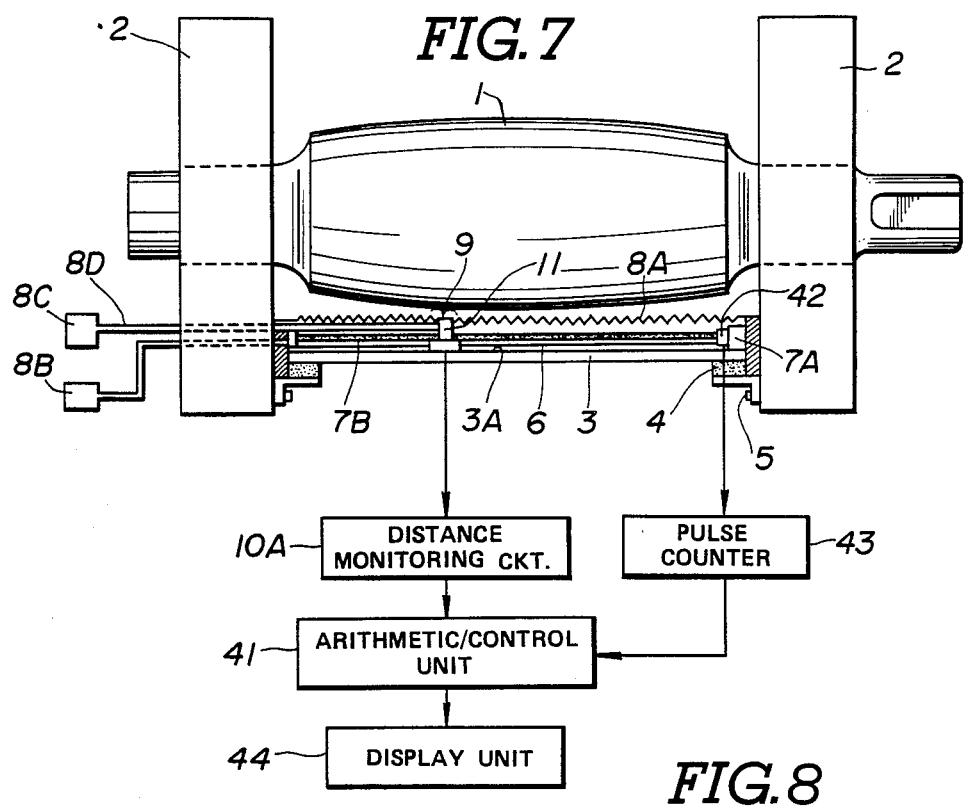
FIG. 7 is a fragmentary block diagram showing an embodiment of a roller profile monitoring system as an application of the ultrasonic sensor system according to the present invention.

FIG. 6 shows the results of an experiment checking the effect of temperature dependent correction on the distance measurement. The experiment was performed by varying the water temperature over the range of 5° C. to 45° C. As can be seen in FIG. 6, when there is no temperature dependent correction, an error of about 1,000 $\mu$m exists in the results of measurement. On the other hand, by performing temperature dependent correction according to the preferred embodiment, the error becomes less than $\pm 5$ $\mu$m. Therefore, an accuracy better times 10 times higher than can be obtained by with the temperature dependent correction FIG. 7 shows one example of application of the aforementioned ultrasonic sensor system according to the invention. In the shown example, the ultrasonic sensor system is used to monitor the profile of a roller roller, such as a roller employed in a rolling mill.

The roller profile monitoring system illustrated in FIG. 7 comprises a pair of roller-chock frames 2 which rotatably support opposite ends of a roller 1. The roller chock frames 2 are connected to a base 3 through rubber dampers 4, by means of fastening bolts 5. The dampers are provided to absorb shock exerted on the roller chock frames 2 and/or the roller 1. The base 3 has a reference plane 3a lying substantially parallel to the longitudinal axis of the roller 1. A rail 6 is mounted on the reference plane 3A and extends substantially parallel to the roller axis. The sensor head 11 is slidably or movably mounted on the rail 6 for movement therealong. The sensor head 11 is associated with a drive mechanism to be driven to move along the rail 6. The driving mechanism comprises an electric motor 7A and a threaded propelling shaft 7B which is engageable with a threaded opening (not shown) formed in the sensor head 11 so as to drive the sensor head through a distance corresponding to the rotation thereof when driven by the motor 7A.

Although a specific driving mechanism for the sensor head 11 has been illustrated in FIG. 7, it can be constructed in various ways. For instance, the sensor head can be driven by a driving belt which is, in turn, driven by the motor 7A, with an appropriate power transmission mechanism. A dust-proof cover 8A of expandable and flexible construction, such as a bellows sheet, is provided to cover the drive mechanism and the reference surface 3A of the base 3. The space defined between the reference surface 3A and the dust proof cover 8A communicates with a purge air source 8B. A purge air from the purge air source 8B is introduced into the space to protecting the drive mechanism and the sensor head 11 from heat, water and dust.

The sensor head is also connected to a water source 8C via a water supply circuit 8D. In the preferred construction, the water supply circuit 8d comprises a flexible hose so as to allow movement of the sensor head 11 along the rail 6. The water from the water source 8C is preferably pressurized to a predetermined pressure so as to form a water jet 9 when discharged through the water jet nozzle 12 shown in FIG. 2.

The ultrasonic sensor circuit, denoted by the reference numeral "10A" and designed as disclosed with reference to FIG. 1 is connected for output to an arithmetic/control unit 41. The arithmetic/control unit 41 is also connected for input from a pulse counter 43 which is, in turn, connected for input from an encoder 42. The encoder 42 produces a pulse in response to a predetermined angle of rotation of the propelling shaft 7B. The pulses from the encoder 42 are counted by the pulse counter 43. The pulse counter 43 produces a counter signal which is indicative of its counter value and, thus indicative of the position of the sensor head 11 along the rail 6. Based on the counter signal from the pulse counter 43, the arithmetic/control unit 41 derives the axial position of the target surface with respect to the roller axis. In cases where the roller axis is inclined with respect to the reference surface 3A of the base, an inclination-dependent correction for the axial position of the target surface may be performed for higher accuracy of the derived data.

Thus, the arithmetic/control unit 41 receives distance indicative data from the ultrasonic sensor circuit 10A and target surface position indicative data from the pulse counter and outputs those data to a profile display unit 44.

The arithmetic/control unit 41 also sends a drive control signal to the electronic motor 7A. The target surface position indicative counter signal from the pulse counter may serve as a feedback signal in determining the angular displacement of the propeller shaft needed to shift the sensor head 11 to the next scanning point according to a predetermined schedule.

In practice, the arithmetic/control unit 41 corrects the distance and axial position data at the end of the axial shift of the sensor head 11. Specifically, during rolling, the axial ends of the roller are free from wear and should lie at the same distance from the reference surface when the roller axis is substantially parallel to the reference surface. Therefore, by comparing the distances to the ends, the correction values for both axial position data and distance data can be derived. Alternatively, it would also be possible to set the roller I up so that the roller axis lies substantially parallel to the reference surface by setting the roller to have the same distance from the reference surface at both ends. In this case, the distance to each end can be precisely measured by the ultrasonic sensor system as set forth above.

Figure 8:
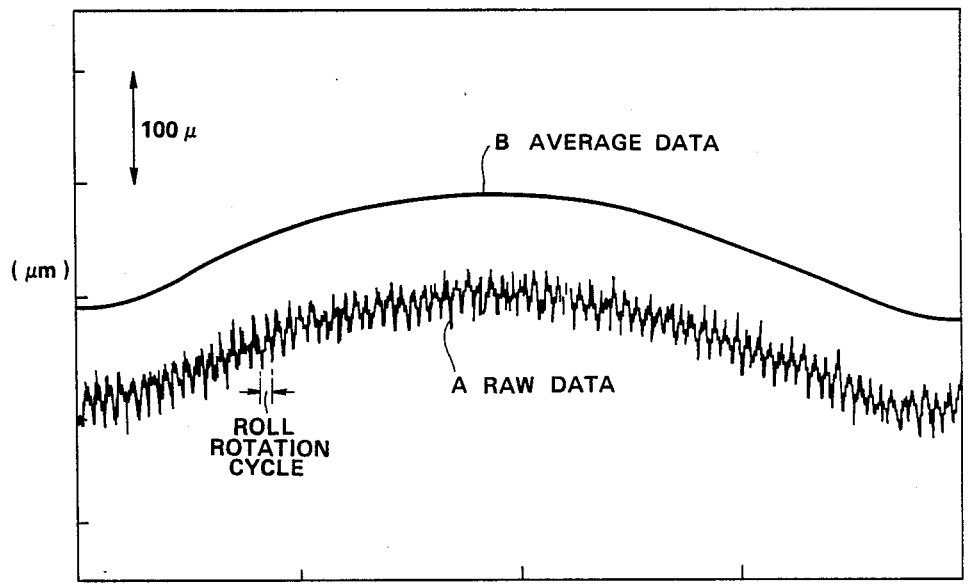
FIG. 8 is a graph of the results of measurement performed by the roller profile monitoring system of FIG. 7.

FIG. 8 shows the results of monitoring of the roller profile monitored by the preferred embodiment. In FIG. 8, the line A shows raw data of scanning of the distance to the roller surface from the sensor head 11. On the other hand, line B shows smoothed data in which the data of line A is processed by averaging to avoid vibration of the base and influence of eccentricity and vibration of the roller as it rotates. As will be appreciated herefrom, the preferred embodiment of the roller profile monitoring system clearly reveals, a roller crown of about 100 $\mu$m.

Figure 9:
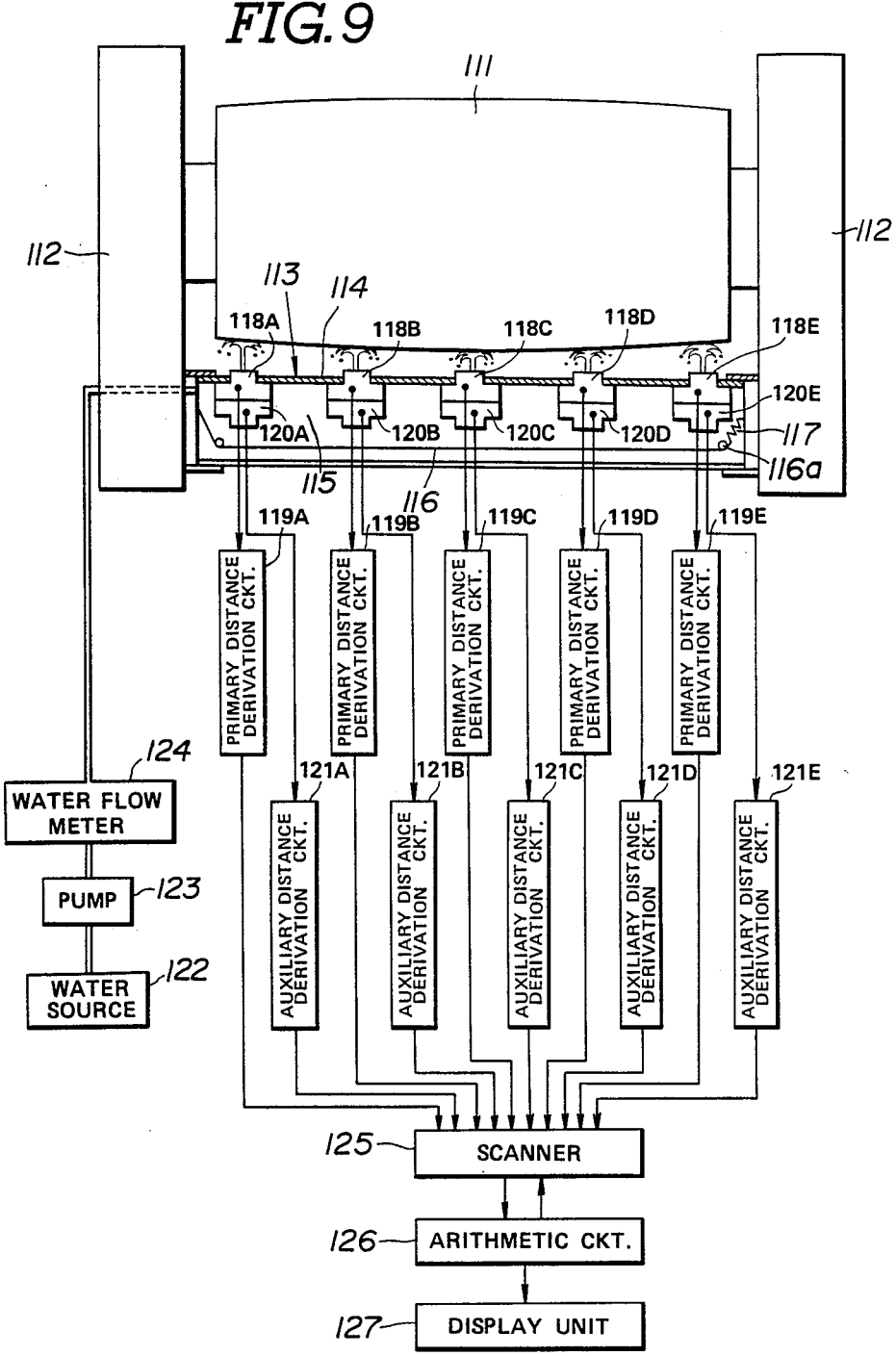
FIG. 9 shows another embodiment of a roller profile monitoring system according to the invention.

FIG. 9 shows a modification to the aforementioned preferred embodiment of the roller profile monitoring system according to the present invention. In this modification, a plurality of ultrasonic sensors are employed to monitor the roller profile. The ultrasonic sensor comprises primary sensors 118A, 118B, 118C, 118D and 118E designed to transmit ultrasonic waves toward corresponding parts of the roller surface and aligned parallel to the roller axis at given intervals between adjacent sensors, and auxiliary sensors 120A, 120B, 120C, 120D and 120E. The auxiliary sensors 120A, 120B, 120C, 120D and 120E are coupled to corresponding primary sensors 118A, 118B, 118C, 118D and 118E at the same axial positions. The auxiliary sensors 120A. 120B, 120C, 120D and 120E are designed to transmit ultrasonic waves in the opposite direction to the transmission direction of the ultrasonic waves from the primary sensors 118A, 118B, 118C. 118D and 118E.

In the preferred construction, each pair of the primary and secondary sensors 118A and 120A, 118B and 120B, 118C and 120C, 118D and 120D and 118E and 120E are fixed to each other and supported by a base 113. The base 113 has a reference surface 114 lying substantially parallel to the axis of the roller 111. The base 113 is preferably made from a hollow steel pipe or the like so as to define therein a space 115 for receiving the assemblies of the primary and secondary sensors. The internal space 115 of the base 113 is filled with water supplied by way of a water supply system which comprises a water source 122, such as a water reservoir, a water pump 123 and a water flowmeter 124.

A wire 116 is stretched through the internal space 115 of the base 113 so as to cross all of the ultrasonic wave paths. One end of the wire 116 is rigidly fixed to the base 113 and the other end is connected to a spring 117 serving as a tensioner. The wire 116 is guided by guides 116a to extend parallel to the roller axis. The spring 117 exerts a given tension on the wire 116 to hold the wire straight. In the preferred construction, the wire is a piano wire 1 mm in diameter and the spring 117 has a tension of 30 kg to 40 kg. In this case, if the tension should deviate by as much as 10%, the deviation of the straightness of the wire 116 will be equal to or less than 5 $\mu$m.

It should be appreciated that the primary sensors 118A, 118B, 118C, 118D and 118E have the same construction as disclosed with reference to FIGS. 1 to 4, and are designed to direct water jets onto corresponding points of the roller surface. The water jets are generated by the water pressure introduced into the inner space 115 of the base and discharged through the sensor heads of the primary sensor. The water in the inner space 115 of the base 113 also serves as the ultrasonic wave transmission medium for the auxiliary sensors 120A, 120B, 120C, 120D and 120E. Furthermore, the water in the inner space 115, serves to cool the base and to absorb vibrations of wire.

The primary sensors 118A, 118B. 118C, 118D and 118E are connected to respectively Corresponding sensor circuits 119A, 119B, 119C, 119D and 119E, each of which has substantially the same circuitry as disclosed with respect to FIG. 1 or FIG. 4. Similarly, the secondary sensors 120A, 120B, 120C, 120D and 120E are connected to respectively corresponding sensor circuits 121A, 121B, 121C, 121D and 121E, each of which also have substantially the same circuitry as disclosed with reference to FIG. 1 or FIG. 4. Therefore, the primary sensors 118A, 118B, 118C, 118D and 118E are designed to measure the distance to the corresponding points on the roller surface. On the other hand, the auxiliary sensors 120A, 120B, 120C, 120D and 120E are responsive to the ultrasonic waves reflected by the wire 116 to measure the distance to the wire 116. As set forth above, since tension is constantly applied to the wire 116 by means of the spring 117, the wire 116 is held substantially straight. Therefore, if the base 113 is somewhat deformed, which results in deformation of the reference surface 114, the deformation can be monitored by measuring the distance to the wire 116 at each measurement point. The deformations detected by measurement of the distances to the different points on the wire 116 yield correction values for correcting the distance values derived on the basis of the measurements performed by the primary sensors. This allows precise measurement of the roller profile while eliminating the influence of deformation of the base 113.

The sensor circuits 119A, 119B, 119C, 119D, 119E and 121A, 121B, 121C, 121D and 121E are connected for output to a scanner circuit 125. The scanner circuit 125 is, in turn, connected for output to an arithmetic circuit 126 which is associated with a display unit 127. The scanner 125 selectively connects one of the sensor circuits to the arithmetic circuit 126 to introduce distance indicative data from the connected one of the sensor circuits for derivation of the distance based thereon.

Figure 10:
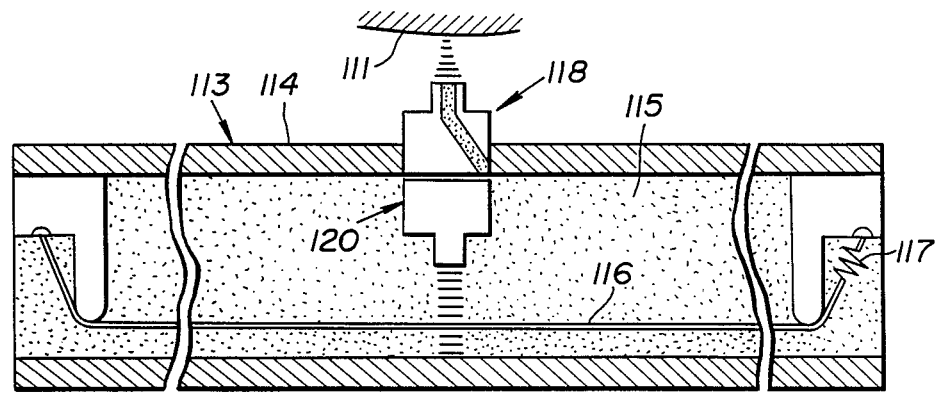
FIG. 10 is an enlarged longitudinal section through an auxiliary sensor employed in the roller profile monitoring system of FIG. 9.

The arithmetic operations performed by the arithmetic circuit 126 are substantially the same as disclosed with respect to FIG. 1 or FIG. 4. FIG. 10 shows an exploded view of one sensor 118 and 120 fixed to each other and supported by base 113. Reference surface 114 remains substantially parallel to the axis of roller 111. Space 115 is filled with a liquid and contains wire 116 as tensioned by spring 117.

Figure 11:
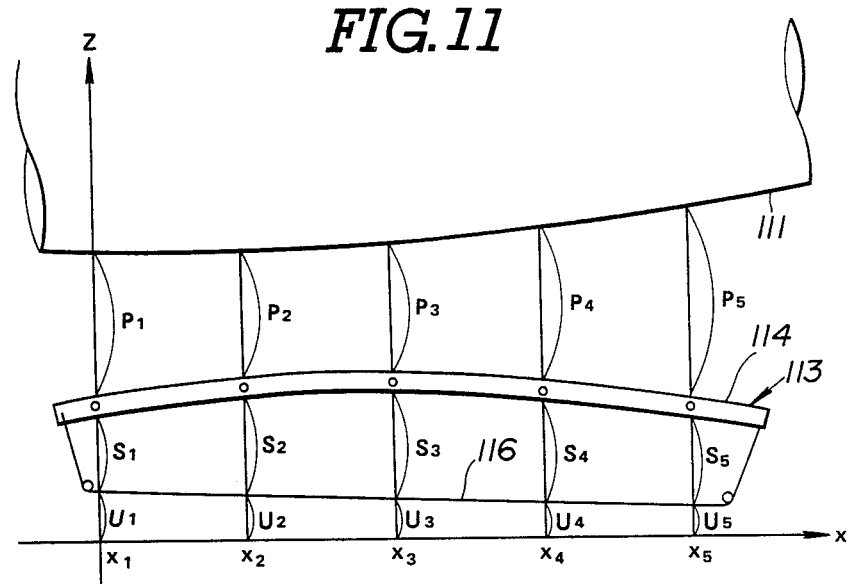
FIG. 11 is a diagram of the operating principles of the roller profile monitoring system of FIG. 9.

In practical measurement, each sensor 118A, 118B, 118C, 118D, 118E and 120A, 120B, 120C, 120D, 120E cyclically measures the distance at given intervals, e.g. 200 μsec. intervals. The scanner circuit 125, first, passes the distance indicative signals from the sensor circuits 119A, 119B, 119C, 119D and 119E in sequence. The arithmetic circuit 127 derives the respective distances $P_1$, $P_2$, $P_3$, $P_4$ and $P_4$ (see FIG. 11) based on the distance indicative signals from the sensor circuits 119A, 119B, 119C, 119D and 119E. Subsequently, the scanner circuit 125 introduces the distance indicative signals from the sensor circuits 121A, 121B, 121C, 121D and 121E to the arithmetic circuit 126. The arithmetic circuit 126 derives the distances $S_1$, $S_2$, $S_3$, $S_4$ and $S_5$ (see FIG. 11) to the wire 116 at respectively corresponding points. The distance values derived in the arithmetic circuit 126 are used to derive the distance $Z_i(i=1, 2 \ldots 3)$ from an axis x parallel to the axis of the roller 111 to the target surface at each of the measurement points, by the following equation:

$$Z_i = P_i + S_i + U_i$$

It should be noted that the distances $U_1$, $U_2$, $U_3$, $U_4$ and $U_5$ (see FIG. 11) are derived beforehand by measuring the profile of a reference roller with a known profile. Specifically, by measuring the known profile of the reference roller, the values $U_i$ can be arithmetically derived by measuring $P_i$ and $S_i$. Therefore, the distance $U_i$ from the wire 116 to the axis x becomes a known value for each measuring point. As will be appreciated herefrom, since the axis x is an imaginary axis established as set forth above, the profile can be observed by measuring the distances $P_i$ and $S_i$ at each of the measurement points. Therefore, by the disclosed arrangement, influence of deformation of the base 113 or angular shift of the roller axis can be satisfactorily and successfully avoided.

Figure 12:
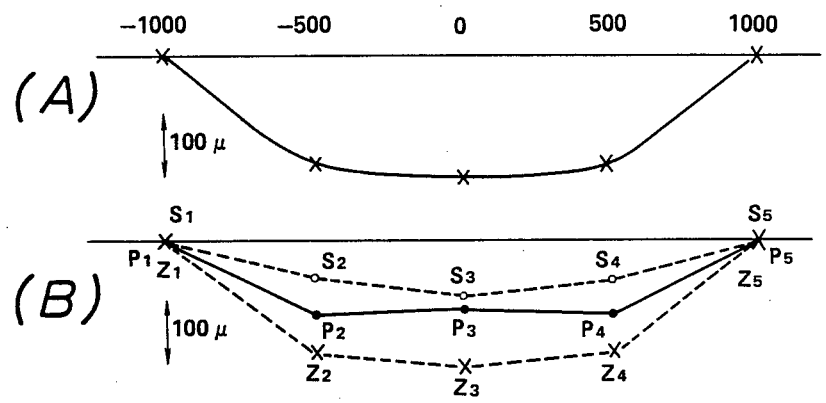
FIG. 12 is a graph of the results of measurement performed by the system of FIG 9.

FIGS. 12(A) and 12(B) show the results of measurements performed by the roller profile monitoring system of FIG. 9. FIG. 12(A) shows the results of measurements performed under normal conditions, which substantially match with the results of measurements performed by a micrometer. FIG. 12(B) shows the result of another measurement, in which a 20-kg load is applied for the base to intentionally deform of the base 113. As will be seen from 12(B), the distance $P_i$ derived on the basis of the distance indicative data from the primary sensor is influenced by the deformation (about 100 μm) of the base. However, the distance value $S_i$ of the auxiliary sensors clearly reflect the deformation of the base. Therefore, the distance $Z_i$ as corrected value of the distance value $P_i$ with the correction value derived based on the distance value $S_i$ substantially corresponds to the result shown in FIG. 12(A).

Figure 13:
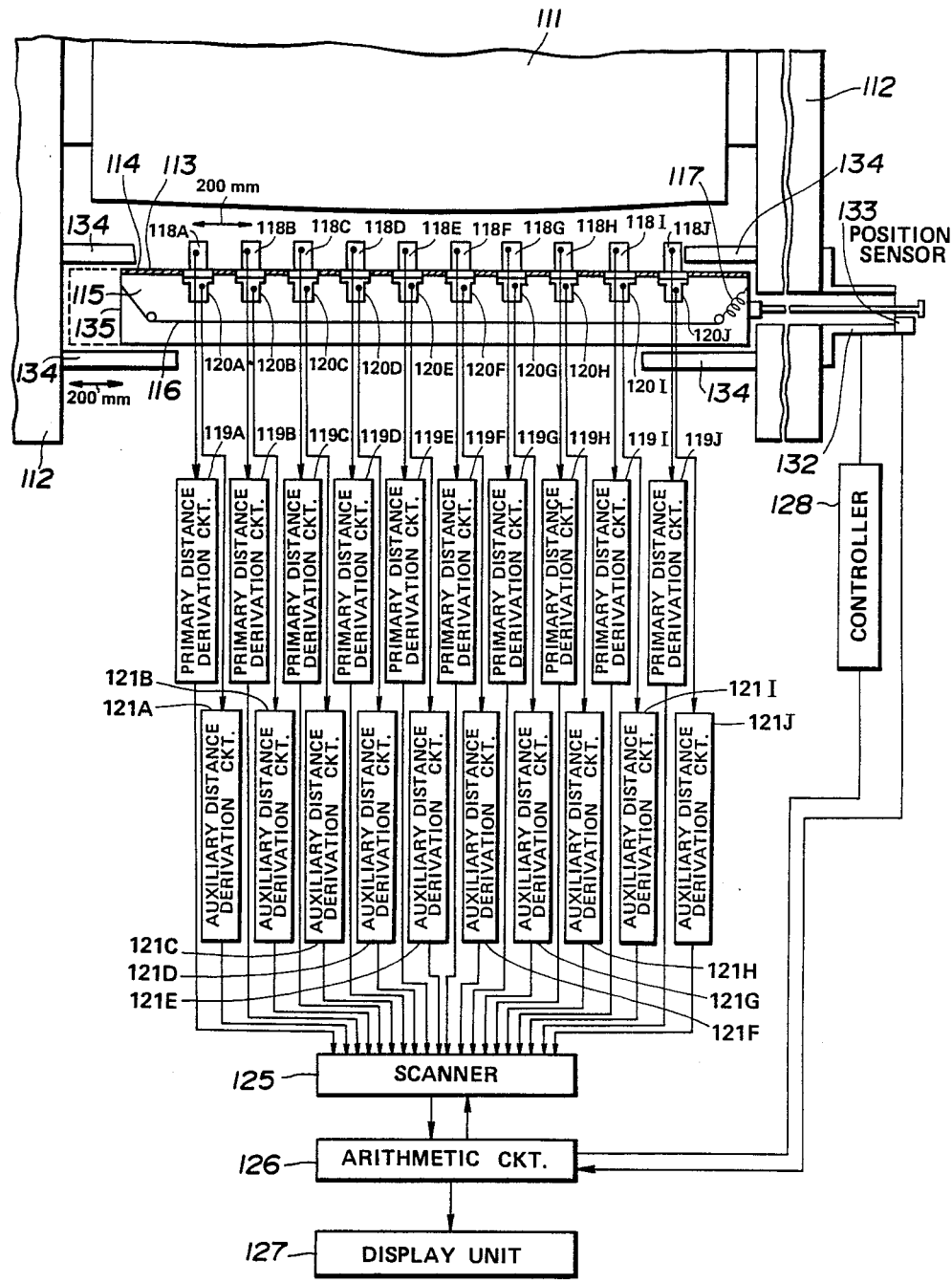
FIG. 13 shows another preferred embodiment of a roller profile monitoring system according to the present invention.

FIG. 13 shows a further modification of the preferred embodiment of the roller profile monitoring system according to the invention. In this embodiment, the base 113 is slidingly or movably supported by guides 134 to allow axial movement of the base 113. The base 113 is also associated with a driving means 132 capable of axially moving the former. The driving means 132 is associated with a position sensor 133 which detects the axial position of the drive means and thus detects the position of the base 113. In practice, the driving means 132 is intended to axially shift the base 113 to an extent approximately corresponding to the spacing between the sensor assemblies, which each comprise a primary sensor 118 and a auxiliary sensor 120.

In the shown embodiment, 10 sensor assemblies are arranged on the base 113 at 20-cm intervals. Therefore, the driving means 132 can drive the base 113 as far as approximately 20 cm. The velocity of axial motion of the base 113 is controlled to be within the range of 10 mm/sec to 200 mm/sec. Preferably, the base 113 is driven at constant velocity throughout its travel.

Figure 14:
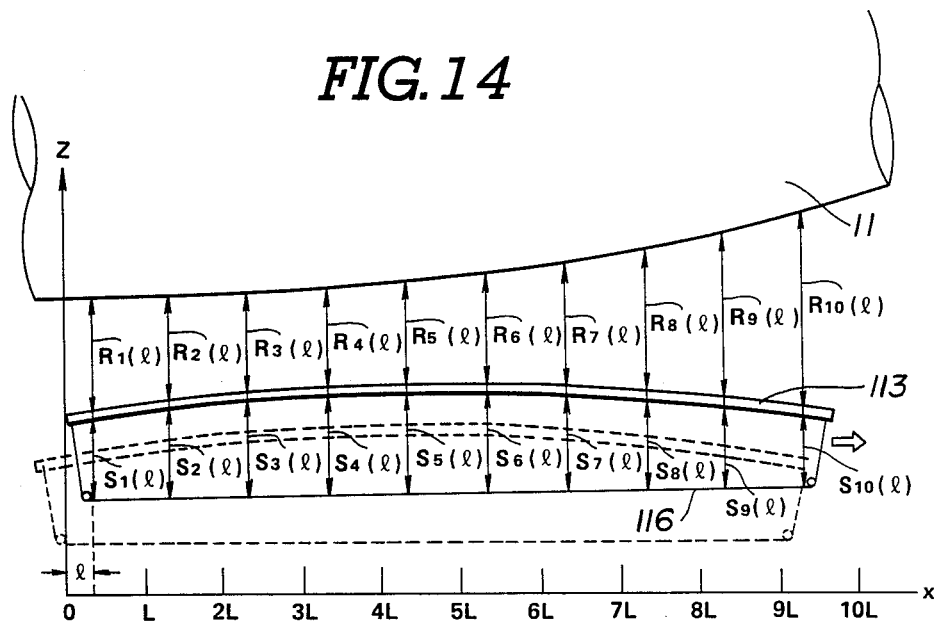
FIG. 14 is a diagram of the operating principles of the roller profile monitoring system of FIG. 13.

As shown in FIG. 14, when the base 113 is shifted from its initial position through the distance l, the distances $R_1(l)$, $R_2(l) \ldots R_{10}(l)$ are derived from the results of measurement by the primary sensors 118A, 118B ... 118J, and the distance $S_1(l)$, $S_2(l) \ldots S_{10}(l)$ are derived from the results of measurement by the auxiliary sensors 120A, 120B ... 120J.

In order to simplify the following description, it is assumed that the wire 116 extends substantially parallel to the x-axis in FIG. 14 and thus the distance value $U_i$ is constant over all measurement points.

Therefore, the roller profile indicative distance value $Z_i$ after correction at each of the measurement points can be expressed by the following equation:

$$Z = R_i + S_i$$

Therefore, the roller profile indicative distance value $Z_i(l)$ at each measurement point when the base 113 is shifted to the extent l can be expressed ...

$$Z_i(l) = R_i(l) + S_i(l)$$

The x-coordinate, i.e. the axial coordinate, of the measurement points are l, L+l, 2L+l ... 9L+l.

Shifting the base 113 through a distance corresponding to the axial spacing L of the sensor assemblies, allows the roller profile indicative distance values $Z_i$ to form a sequence of roller surface contour values covering fixed axial points.

For precise measurement of the roller profile, it is necessary to correct the roller profile indicative distance value $Z_i$. taking into account the displacement of the sensor assemblies perpendicular to the x-axis and variation of relative inclination between the sensor and the roller surface.

The correction process will be described hereafter in terms of the roller profile indicative distance value $Z_i(L)$ at the fully-shifted position of the base 113. The correction is given by the equation . . .

$$Z'_i(L) = Z_i(L) + a_1 \times i + b_1$$

where coefficients a and b are derived so as to minimize $\Delta$, defined in the following equation:

$$\Delta = \sum_{i=1}^{9} \{Z'_i(L) - Z_{i+1}(0)\}^2$$

where $Z_i(0)$ (i=1 to 10) are the measured values at the initial positions.

Then, $Q_i$ (shown in FIG. 15) (i=1 to 11) is derived from the following equation:

$$\begin{aligned} Q_i &= Z_i(0): i = 1 \\ &= \{Z'_{i-1}(L) + Z_i(0)\}/2: i = 2\text{-}10 \\ &= Z'_{10}(L): i = 11 \end{aligned}$$

Then, $Q'_i$ (i=1 to 11) can be derived from the following equation:

$Q'_i$ to 11) is the roller profile indicative distance value at each of the measurement points given by the x-coordinates x=0, L, 2L, 10L.

Interpolation in the regions (0, L) and (9L, 10L) can be performed according to the following equations:

$$Z = \frac{Q'_3}{2L^2} \times (x - L) - \frac{Q'_2}{L^2} \times (x - 2L): \text{region } (0, L)$$

$$Z = \frac{Q'_9}{2L^2}(x - 9L)(x - 10L) - \frac{Q'_{10}}{L^2}(x - 8L)(x - 10L):$$

$$\text{region } (9L, 10L)$$

Then, the roller profile indicative distance values $W_i$ at any of the intermediate points shifted through a distance l is derived by modifying the distance value $Z_i(l)$ (i+1, 2, . . . 10) according to the following equation:

$$W_i = Z_i(l) + a_2 \times i + b_2$$

where $$a_2 = \frac{1}{9}\left( -Z_{10}(l) + Z_1(l) + \frac{Q'_9}{2L^2} l(l-L) - \right.$$

$$\left. \frac{Q'_{10}}{L^2}(l+L)(l-L) - \frac{Q'_3}{2L^2} l(l-L) + \frac{Q'_2}{L^2} l(l-2L) \right)$$

$$b_2 = \frac{1}{9}\left( -10Z_1(l) + Z_{10}(l) + \frac{5Q'_3}{L^2} l(l-L) - \right.$$

$$\left. \frac{10Q'_2}{L^2} l(l-2L) - \frac{Q'_9}{2L^2} l(l-L) + \frac{Q'_{10}}{L^2}(l+L)(l-L) \right)$$

The value $W_i$ may be derived at any intermediate measuring point according to the foregoing procedure.

Based on the values $W_i$, coordinates $(X_i, Z_i)$ at respective measuring points offset by $P_i$ are derived by:

$$X_i = l + L \times (i-1)$$

$$Z_i = W_i$$

Figure 15:
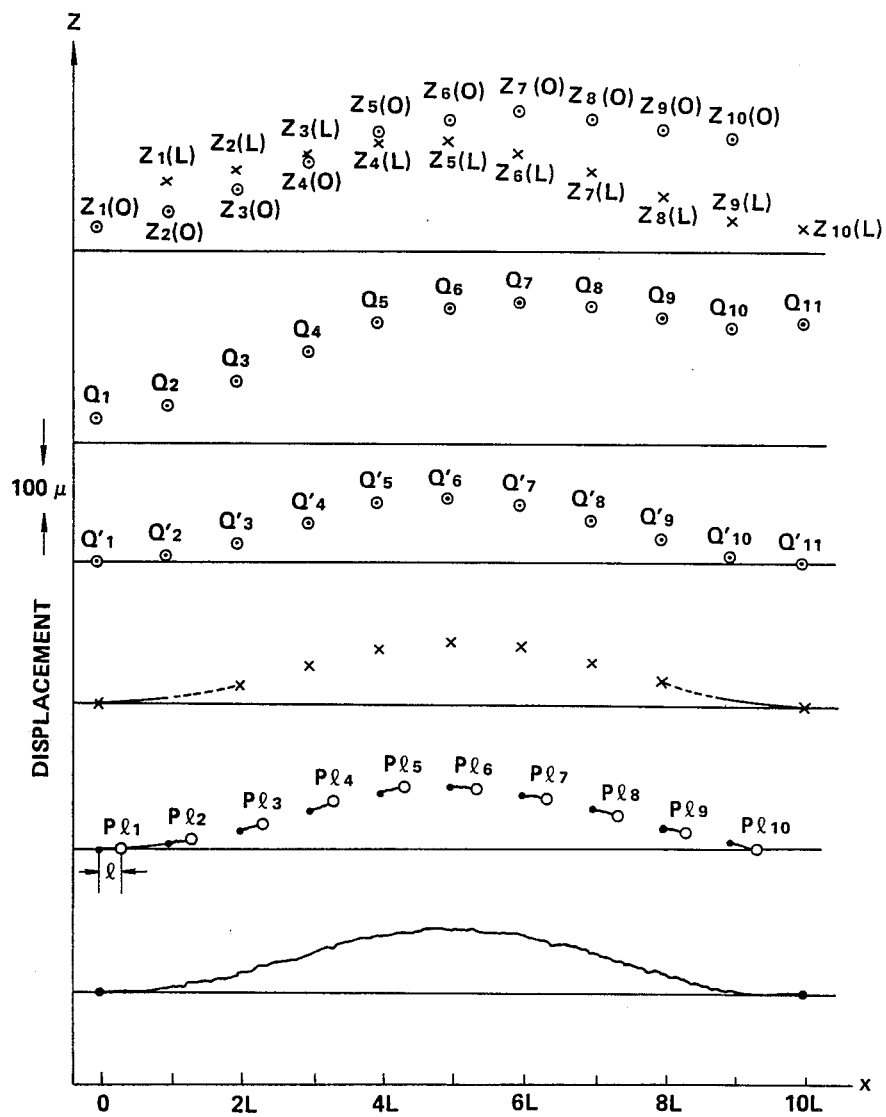
FIG. 15 is a graph of the results of measurement performed by the roller profile monitoring system of FIG. 13.

Therefore, the derived coordinates of the sequential measurement points form a continuous curve representing the roller profile, as shown in FIG. 15.

As will be appreciated herefrom, the preferred embodiment of the ultrasonic sensor allows precise measurement of the distance to the target surface. Also, the application of this ultrasonic sensor to the preferred embodiment of the roller profile monitoring system allows accurate measurement and monitoring of the roller profile.

Therefore, the present invention fulfills all of the objects and advantages sought therefor.

While the specific arrangements of the preferred embodiments of the invention have been disclosed hereabove in order to facilitate full understanding of the invention, the invention should not be considered to be limited to the specific embodiments but includes all possible embodiments and modifications of the embodiments which can be realized without departing from the principles of the invention set out in the appended claims.

What is claimed is:

1. A system for monitoring a surface condition of an object comprising:
   a base having a reference surface;
   a support means for supporting said object relative to said reference surface;
   a housing defining an internal space therein, said internal space having an opening end opposing said object;
   a liquid state ultrasonic wave transfer medium supply means connected to said housing to supply a pressurized liquid state ultrasonic wave transfer medium to be discharged from said opening end toward said object;
   a surface scanning means, disposed within said internal space of said housing, for transmitting ultrasonic waves through said opening end towards various measuring points on the surface of said object and receiving the ultrasonic waves reflected from each of said measuring points on said surface of said object, and measuring the reflection elapsed time between transmission of said ultrasonic waves and reception of the reflected ultrasonic waves, and deriving from said reflection elapsed time a distance indicative time value with respect to each of the said measuring points;
   a first correction means associated with said housing for deriving the propagation velocity of ultrasonic waves reflected off a surface of said correction means and thus deriving a propagation-velocity-dependent first correction value for correcting said distance indicative time value;
   an arithmetic means connected to said surface scanning means for deriving the distance between each of said measuring points on said surface of said object and said scanning means on the basis of said distance indicative time value and said correction value; and
   a display unit connected to said arithmetic means and adapted to display the resultant data derived from the distance derived by said arithmetic means.

2. The system as set forth in claim 1, wherein said surface scanning means comprises an ultrasonic sensor system comprising:
   a transmitter transmitting ultrasonic waves toward said target surface at a first controlled timing through a predetermined path;
   a receiver adapted to receive the ultrasonic waves reflected by said target surface and to produce a receiver signal when said reflected ultrasonic waves are received;
   a timer means for measuring an elapsed time from said first controlled timing to a second timing at which said reflected ultrasonic waves from said target surface are received; and
   an arithmetic processor means for deriving the distance to said target surface based on said elapsed time, and deriving an output value indicative of said distance to said target surface.

3. The system as set forth in claim 2, wherein said first correction means comprises a reflector member disposed within said path through which said ultrasonic waves are transmitted, said reflector member allowing part of said ultrasonic waves to pass therethrough toward said target surface and reflecting the rest of said ultrasonic waves, and said reflector member being separated from said transmitter through a known distance, said timer means measuring a reference elapsed time between transmission of said ultrasonic waves and reception of the ultrasonic waves reflected by said reflector member, and said processor means deriving said propagation velocity of said ultrasonic waves based on said reference time and said known distance to said reflector member, and deriving said distance indicative value of each of said measuring points based on said propagation velocity and said reflection times.

4. The system as set forth in claim 3, wherein said transmitter and said receiver comprises a common oscillation member which generates ultrasonic waves to be transmitted to each of said measuring points and which oscillates in response to the ultrasonic waves reflected from said measuring points.

5. The system as set forth in claim 4, wherein said oscillation member is connected to a transmitter circuit adapted to drive said oscillation member at a given frequency at a controlled timing so as to generate said ultrasonic waves to be transmitted to said measuring point, and to a receiver circuit for detecting oscillation of said oscillation member and producing a receiver signal whenever oscillation of the oscillation member is detected.

6. The system as set forth in claim 5, wherein said timer means is responsive to driving of said oscillation member for transmitting ultrasonic wave to start measurement of said elapsed times.

7. The system as set forth in claim 6, wherein said processor means derives the velocity of sound on the basis of said reference time and the known distance to said reflector member, and derives said distance to said measuring points on the basis of said derived sonic velocity and said reflection time.

8. The system as set forth in claim 3, which further comprises a water jet nozzle connected to a water supply and adapted to discharge water toward said measuring points along said ultrasonic wave path.

9. The system as set forth in claim 3, which further comprises a transmitter circuit producing a transmitter control signal ordering said transmitter to generate said ultrasonic waves to be transmitter to said measuring points at a controlled timing.

10. The system as set forth in claim 9, wherein said timer means comprises a first timer for measuring said reference time and a second timer for measuring said reflection time, and said first and second timers being responsive to said transmitter control signal to start measurement of said reference and reflection times, respectively.

11. The system as set forth in claim 10, which further comprises a first latch signal generator means associated with said first timer and responsive to reception of said reflected ultrasonic waves from said reflector means for generating a firstlatch signal and latching a timer value of said first timer, and a second latch signal generator means associated with said second timer and responsive to said reflected ultrasonic waves from said measuring points for generating a second latch signal and latching a timer value of said second timer.

12. The system as set forth in claim 11, wherein said first latch signal generator means comprises a first delay circuit adapted to produce a first enabling signal having a given duration after a given first delay following said transmitter control signal, and a first latch signal generator responsive to reception of said reflected ultrasonic waves in the presence of said first enabling signal for generating said first latch signal, and wherein said second latch signal generator means comprises a second delay circuit adapted to produce a second enabling signal having a given duration after a given second delay following said transmitter control signal, and a second latch signal generator responsive to reception of said reflected ultrasonic wave in the presence of said second enabling signal for generating said second latch signal.

13. The system as set forth in claim 12, wherein said first delay time approximately corresponds to the minimum elapsed time before reception of said reflected ultrasonic waves from said reflector member, and said second delay time approximately corresponds to the minimum elapsed time before reception or said reflected ultrasonic waves from said measuring point.

14. The system as set forth in claim 9, which further comprises a first delay circuit adapted to produce a first enabling signal from a first delayed pulse generator for measuring said reflection elapsed time, said first enabling signal having a given duration after a given first delay following said transmitter control signal, and a second delay circuit adapted to produce a second enabling signal from a second delayed pulse generator for measuring said reference elapsed time, said second enabling signal having a given duration after a given second delay following said transmitter control signal.

15. The system as set forth in claim 14, wherein said first and second delay circuits are connected to said timer means via a switching circuit which is adapted to selectively pas one of said first and second enabling signals to said timer circuit, said timer means being responsive to reception of said reflected ultrasonic wave in the presence of said first and second enabling signals for latching first and second timer values representative of said reference an reflection times, respectively.

16. The system as set forth in claim 3, wherein an ultrasonic sensor is associated with a driving means which drives said sensor among said various measuring points on the surface of said object.

17. The system as set forth in claim 16, wherein said base movably accommodates said ultrasonic sensor.

18. The system as set forth in claim 16, wherein said driving means is associated with a position sensor which is adapted to detect the ultrasonic sensor position relative to said object for controlling positioning of said ultrasonic sensor.

19. The system as set forth in claim 17, wherein said driving means is associated with a position sensor which is adapted to detect the ultrasonic sensor position relative to said object for controlling positioning of said ultrasonic sensor.

20. The system as set forth in claim 19, wherein said base accommodates said ultrasonic sensor within a chamber filled with a liquid ultrasonic wave transmission medium.

21. The system as set forth in claim 20, which further comprises a second correction means for detecting deflection of said base and deriving a second correction value for modifying said distance indicative value of each of said measuring points.

22. The system as set forth in claim 21, wherein said second correction means comprises an auxiliary ultrasonic sensor coupled with said surface scanning means, directed in a direction opposite to the direction of said surface scanning means and adapted to transmit ultrasonic waves toward a straight wire defining a reference line which lies essentially parallel to said reference surface under normal conditions.

23. The system as set forth in claim 22, wherein said straight wire is associated with a tensioning means constantly applying tension to said wire so as to hold the wire straight.

24. A process for monitoring a surface condition of an object comprising the steps of:
defining a reference surface at a position away from said object;
positioning a scanning means which comprises an ultrasonic sensor transmitting ultrasonic waves toward a surface of said object to be monitored and receiving ultrasonic waves reflected by said surface of said object;
discharging a liquid state medium carrying said ultrasonic wave toward said surface to be monitored substantially along the axis of said ultra-sonic waves;
providing a reference distance indicative member having a reference surface within the path of the ultrasonic waves which thereby reflects some of the transmitted ultrasonic waves, said reference distance indicative member being positioning at a predetermined distance from said scanning means;
supporting said object such that said surface of said object opposes said reference surface of said object through said path;
measuring a first elapsed time between transmission of said ultrasonic waves and reception of the ultrasonic waves reflected by said reference distance indicative member;
measuring a second elapsed time between transmission of said ultrasonic waves and reception of the ultrasonic waves reflected by said surface to be monitored;
deriving the velocity of sound on the basis of said first elapsed time and the know distance to said reference distance indicative member;
deriving the distance between said reference surface and said surface to be monitored on the basis of said sonic velocity and said second elapsed time;
performing the preceding distance measurement steps at various measuring points on said surface of said object so as to establish numerous surface condition data; and
displaying the resulting surface condition data on a display.

25. The process as set forth in claim 24, which further comprises the step of driving said scanning means according to a predetermined scanning schedule and performing distance measurement at various measuring points on said scanning schedule.

26. The process as set forth in claim 24, which further comprises a step of providing a linear member defining a substantially straight reference line relative to which deflection of said reference surface is monitored, providing an auxiliary ultrasonic sensor for transmitting auxiliary ultrasonic waves toward said reference line and receiving the ultrasonic waves reflected by said reference line defining member, measuring elapsed time between transmission of said auxiliary ultrasonic waves and reception of the reflected ultrasonic waves from said reference line defining member, deriving the distance between said reference surface and said reference line, deriving the deflection of said reference surface relative to said reference line on the basis of said derived distance, and modifying said surface condition data on the basis of the derived deflection.

27. A roller profile monitoring system comprising:
a movable base defining a reference surface and movable along its longitudinal axis within a predetermined travel range;
a stationary support adapted to support said roller above said reference surface such that the roller axis lies parallel to said longitudinal axis of said movable base;
a plurality of primary ultrasonic sensors mounted on said reference surface, each of said primary ultrasonic sensors transmitting ultrasonic waves toward a corresponding measuring point on said roller surface and receiving ultrasonic waves reflected by the roller surface at said measuring point;
a substantially straight member lying essentially parallel to said longitudinal axis of said base and providing a substantially straight reference line with respect to which deflection of said reference surface is to be monitored;
a plurality of auxiliary ultrasonic sensors coupled with respectively corresponding primary ultrasonic sensors, each transmitting ultrasonic waves toward said straight member and receiving the ultrasonic waves reflected by said straight member;
a first timer means associated with each of said primary ultrasonic sensors, for measuring a first elapsed time between transmission of said ultrasonic waves from said primary ultrasonic sensor and reception of the reflected ultrasonic waves from said roller surface and producing a first elapsed time indicative signal;
a second timer means associated with said auxiliary ultrasonic sensors for measuring a second elapsed time between transmission of said ultrasonic waves from said auxiliary ultrasonic sensor and reception of said reflected ultrasonic waves from said straight member and producing a second elapsed time indicative signal;

an arithmetic means deriving the distances between the respective primary ultrasonic sensors and the corresponding measuring points on said roller surface on the basis of said first elapsed time indicative signals, detecting the deflection of said reference surface on the basis of said second elapsed time indicative signals, deriving correction values, modifying said derived distances based on said correction values and deriving roller profile indicative data; and a display means receiving said roller profile indicative data and displaying the received data on a display.

28. The roller profile monitoring system set forth in claim 27, wherein said primary ultrasonic sensors are arranged along said roller axis at predetermined regular intervals.

29. The roller profile monitoring system as set forth in claim 28 wherein said given travel range of said movable base approximately correspond to said interval between said primary sensors.

30. The roller profile monitoring system as set forth in claim 29, wherein said base comprises a hollow structure defining therein an internal space through which said straight member extends.

31. The roller profile monitoring system as set forth in claim 30, wherein said internal space is filled with a water.

32. The roller profile monitoring system as set forth in claim 27, which further comprises a position sensor for monitoring the axial position of said base producing a base position indicative signal.

33. The roller profile monitoring system as set forth in claim 32, wherein said arithmetic circuit is responsive to said base position indicative signal for arithmetically deriving the offset of said base relative to said roller in a direction perpendicular to said longitudinal axis and deriving a transverse shift dependent correction value for correcting said roller profile indicative data.

34. The roller profile monitoring system as set forth in claim 27, wherein each of said primary and auxiliary sensors comprises:

a transmitter transmitting ultrasonic waves toward said surface at a first controlled timing along a predetermined path;

a reflector member disposed within said path along which said ultrasonic wave is transmitted toward said surface, said reflector member allowing some of said ultrasonic waves to pass therethrough to reach said surface and reflecting the rest of said ultrasonic waves, and said reflector member being separated from said transmitter by a known distance;

a receiver adapted to receive the ultrasonic waves reflected by said reflector member and by said surface and to produce a receiver signal when said reflected ultrasonic waves are received;

a timer means for measuring said first elapsed time from said first controlled timing to a second timing at which said reflected ultrasonic waves from said measuring point of said roller surface are received, and a third elapsed time from said first controlled timing to a third timing at which said reflected ultrasonic waves from said measuring point are received, and said arithmetic deriving the velocity of sound on the basis of said third elapsed time and the known distance and deriving the distance to said measuring point based on said first elapsed time and said sonic velocity.

35. The roller profile monitoring system as set forth in claim 34 wherein said transmitter and said receiver comprises a common oscillation member which generates ultrasonic waves to be transmitted to said measuring point and oscillates in response to the ultrasonic waves reflected from said measuring point.

36. The roller profile monitoring system as set forth in claim 35, wherein said oscillation member is connected to a transmitter circuit adapted to drive said oscillation member at a given frequency at a controlled timing for generating said ultrasonic waves for transmission to said measuring point, and to a receiver circuit for detecting oscillation of said oscillation member and producing a receiver signal whenever oscillation of the oscillation member is detected.

37. The roller profile monitoring system as set forth in claim 36, wherein said timer means is responsive to the first receiver signal which is produced in response to driving of said oscillation member for transmitting ultrasonic waves and starting measurement of said elapsed times, to the second receiver signal to latch a first timer value serving as said first elapsed time indicative value, and to the third receiver signal to latch a second timer value serving as said third elapsed time indicative value.

38. The roller profile monitoring system as set forth in claim 34, which further comprises a water jet nozzle connected to a water supply and adapted to discharge water toward the corresponding measuring point along said ultrasonic wave path.

39. The roller profile monitoring system as set forth in claim 34, which further comprises a transmitter circuit producing a transmitter control signal ordering said transmitter to generate said ultrasonic waves to be transmitted to said measuring point at a controlled timing.

40. The roller profile measuring system as set forth in claim 39, wherein said timer means comprises a first timer for measuring said first elapsed time and a third timer for measuring said third elapsed time, and said first and third timers are responsive to said transmitter control signal to start measurement of said respective first and third elapsed times.

41. The roller profile measuring system as set forth in claim 40, which further comprises a first latch signal generator means associated with said first timer and responsive to reception of said reflected ultrasonic waves from said reflector means for generating a first latch signal for latching a timer value of said first timer, and a second latch signal generator means associated with said third timer and responsive to said reflected ultrasonic waves from said target surface for generating a second latch signal for latching a timer value of said third timer.

42. The roller profile monitoring system as set forth in claim 41, wherein said first latch signal generator means comprises a first delay circuit adapted to produce a first enabling signal having a given duration after a given first delay following said transmitter control signal, and a first latch signal generator responsive to reception of said reflected ultrasonic waves in the presence of said first enabling signal for generating said first latch signal, and wherein said second latch signal generator means comprises a second delay circuit adapted to produce a second enabling signal having a given duration after a given second delay following said transmitter control signal, and a second latch signal generator responsive the reception of said reflected ultrasonic wave under the presence of said second, enabling signal for generating said second latch signal.

43. The roller profile monitoring system as set forth in claim 42, wherein said first delay approximately corresponds to the minimum elapsed time before reception of said reflected ultrasonic waves from said reflector member, and said second delay time approximately corresponds to the minimum elapsed time before reception of said reflected ultra-sonic waves from said measuring point.

44. The roller profile monitoring system as set forth in claim 40, which further comprises a first delay circuit adapted to produce a first enabling signal having a given duration after a given first delay following said transmitter control signal, and a second delay circuit adapted to produce a second enabling signal having a given duration after a given second delay following said transmitter control signal.

45. The roller profile monitoring system as set forth in claim 44, wherein said first and second delay circuits are connected to said timer means via a switching circuit which is adapted to selectively pass one of said first and second enabling signals to said timer circuit, said timer being responsive to reception of said reflected ultrasonic waves in the presence of said first and second enabling signals to latch said first and second timer values representative of said first and third elapsed times, respectively.

46. The roller profile monitoring system as set forth in claim 27, which further comprises an input selector means interposed between said primary and auxiliary ultrasonic sensors and said arithmetic circuit for selectively inputting one of the elapsed time indicative data from the corresponding one of said primary and auxiliary sensors.

47. A process for monitoring a profile of a roller comprising the steps of:
   defining a reference surface;
   positioning a scanning means on said reference surface, which comprises an ultrasonic sensor transmitting ultrasonic waves in a path toward a surface of said roller to be monitored and receiving ultrasonic waves reflected by said surface of said roller;
   providing a reference distance indicative member which reflects a portion of the transmitted ultrasonic waves, said reference distance indicative member being positioned at a predetermined distance from said scanning means;
   supporting said roller such that said surface to be monitored opposes said reference surface at a roughly known separation;
   transmitting ultrasonic waves toward said surface of said roller and toward said reference distance indicative member;
   injecting an ultrasonic wave carrying medium through a path essentially coaxial to said path of ultrasonic waves directed to said surface of said roller and a path of said ultrasonic waves directed to said reference distance indicative member;
   measuring a first elapsed time between transmission of said ultrasonic waves and reception of the ultrasonic waves reflected by said reference distance indicative member;
   measuring a second elapsed time between transmission of said ultrasonic waves and reception of the ultrasonic waves reflected by said surface of said roller to be monitored;
   deriving the velocity of sound on the basis of said first elapsed time in said ultrasonic wave carrying medium and the know distance to said reference distance indicative member;
   deriving the distance between said reference surface to said surface to be monitored on the basis of said sonic velocity and said second elapsed time;
   driving said scanning means at a predetermined timing at a given velocity among various measuring points on said roller;
   performing the preceding distance measurement steps at said various measuring points on said surface of said roller so as to establish numerous surface condition data; and
   displaying the resultant condition data on a display.

48. The process as et forth in claim 47, which further comprises the step of providing a linear member forming a substantially straight reference line relative to which deflection of said reference surface is monitored, providing an auxiliary ultra-sonic sensor for transmitting auxiliary ultra-sonic waves toward said reference line and receiving ultra-sonic waves reflected by said reference line, measuring elapsed time between transmission of said auxiliary ultra-sonic waves and reception of reflected ultra-sonic waves from said reference line, deriving the distance between said reference surface and said reference line, deriving the deflection of said reference surface relative to said reference line on the basis of said derived distance, and modifying said surface condition data on the basis of the derived deflection.

49. A system for monitoring a surface condition of an object comprising:
   a base having a reference surface;
   a support means for supporting said object relative to said reference surface;
   a housing defining an internal space therein, said internal space having an opening end opposing said object;
   inlet means separate from said opening end connected to said housing for introducing fluid into said internal space;
   a surface scanning means disposed within said internal space of said housing, for transmitting ultrasonic waves through said opening end along with fluid entering said housing through said inlet means towards various measuring points on the surface of said object and receiving the ultrasonic waves reflected from each of said measuring points on said surface of said object, and measuring the reflection elapsed time between transmission of said ultrasonic waves and reception of the reflected ultrasonic waves, and deriving a distance indicative time value with respect to each of said measuring points;
   a first correction means including a reference surface means disposed within said housing and having a reference surface located at a know distance from said surface scanning means, for reflecting part of said ultrasonic wave irradiated on said reference surface, said first correction means being responsive to first occurring distance indicative time value for deriving the propagation velocity of said ultrasonic waves based on said first occurring distance indicative time value and said know distance and thus deriving a propagation-velocity-dependent first correction value for correcting said distance indicative time value;

an arithmetic means connected to said surface scanning means being responsive to second occurring distance indicative time value, for deriving the distance between each of said measuring points on said surface of said object and said scanning means on the basis of said second occurring distance indicative time value and said correction value; and a display unit connected to said arithmetic means and adapted to display the resultant object surface condition indicative data derived from the distance derived by said arithmetic means.

50. A process for monitoring a surface condition of an object comprising the steps of;

defining a reference surface on a reference surface member;

positioning a scanning means on said reference surface, which comprises an ultrasonic sensor transmitting ultrasonic waves toward a surface of said object to be monitored and receiving ultrasonic waves reflected by said surface of said object, providing a reference distance indicative member having a reference surface within the path of the ultrasonic waves which thereby reflects some of the transmitted ultrasonic waves, said reference distance indicative member being positioned at a predetermined distance from said scanning means;

supporting said object such that said surface of said object opposes said surface at a roughly known separation;

transmitting ultrasonic waves toward said surface of said object through said path;

injecting an ultrasonic wave carrying medium through a path essentially coaxial to said path of ultrasonic waves directed to said surface of said object and the path of said ultrasonic waves directed to said reference distance indicative member;

measuring a first elapsed time between transmission of said ultrasonic waves and reception of the ultrasonic waves reflected by said reference distance indicative member;

measuring a second elapsed time between transmission of said ultrasonic waves and reception of the ultrasonic waves reflected by said surface of said object to be monitored;

deriving the velocity of sound on the basis of said first elapsed time in said ultrasonic wave carrying medium and the known distance to said reference distance indicative member;

deriving the distance between said reference surface to said surface to be monitored on the basis of said sonic velocity and said second elapsed time;

driving said scanning means at a predetermined timing and at a given velocity among various measuring points on said object;

performing the preceding distance measurement steps at said various measuring points on said surface of said roller so as to establish numerous surface condition data; and displaying the resultant condition data on a display.

51. A process for monitoring a surface condition of an object comprising the steps of:

defining a reference surface at a position away from said object;

positioning a scanning means which comprises an ultra-sonic sensor transmitting ultra-sonic waves toward a surface to be monitored and receiving ultra-sonic waves reflected by said surface of said object;

providing a reference distance indicative member having a reference surface within the path of the ultra-sonic waves which thereby reflects some of the transmitted ultra-sonic waves, said reference distance indicative member being positioned at a predetermined distance from said scanning means;

supporting said object such that said surface of said object opposes said reference surface at a roughly known separation;

transmitting ultra-sonic waves towards said surface of said object through said path;

measuring a first elapsed time between transmission of said ultra-sonic waves and reception of the ultra-sonic waves reflected by said reference distance indicative member;

measuring a second elapsed time between transmission of said ultra-sonic waves and reception of the ultra-sonic waves reflected by said surface to be monitored;

deriving the velocity of sound on the basis of said first elapsed time and the known distance to said reference distance indicative member;

deriving the distance between said reference surface and said surface to be monitored on the basis of said sonic velocity and said second elapsed time;

performing the preceding distance measurement steps at various measuring points on said surface of said object to establish numerous surface condition data;

providing a linear member defining a substantially straight reference line relative to which deflection of said reference surface is monitored;

providing an auxiliary ultra-sonic sensor for transmitting auxiliary ultra-sonic waves toward said reference line and receiving the ultra-sonic waves reflected by said reference line defining member;

measuring elapsed time between transmission of said auxiliary ultra-sonic waves and reception of the reflected ultra-sonic waves from said reference line defining member;

deriving the distance between said reference surface and said reference line;

deriving the deflection of said reference surface relative to said reference line on the basis of said derived distance;

modifying said surface condition data on the basis of the derived deflection; and displaying the resultant surface condition data on a display.

52. A process for monitoring a profile of a roller comprising the steps of:

defining a reference surface;

positioning a scanning means which comprises an ultra-sonic sensor transmitting ultra-sonic waves toward a surface to be monitored and receiving ultra-sonic waves reflected by said surface of said roller, orientation of said scanning means being so determined that said scanning means is placed at a known distance from said reference surface and that said known distance between said scanning means and said reference surface being substantially shorter than that between said surface of said object to be monitored and said scanning means to provide a predetermined interval of occurrence of reception of reflected ultra-sonic waves reflected by said reference surface and reception of reflected ultra-sonic wave reflected by said surface of roll;

providing a reference distance indicative member within the path of the ultra-sonic waves which thereby reflects some of the transmitted ultra-sonic waves, said reference distance indicative member being positioned at a predetermined distance from said scanning means;

supporting said roller such that said surface to be monitored opposes said reference surface at an roughly known separation;

transmitting ultra-sonic waves toward said surface of said roller through said path;

measuring a first elapsed time between transmission of said ultra-sonic waves and reception of the ultra-sonic waves reflected by said reference distance indicative member;

measuring the second elapsed time between transmission of said ultra-sonic waves and reception of the ultra-sonic waves reflected by said surface to be monitored;

deriving the velocity of sound on the basis of said first elapsed time and the known distance to said reference distance indicative member;

deriving the distance between said reference surface and said surface to be monitored on the basis of said sonic velocity and said second elapsed time;

driving said scanning means at a predetermined timing and at a given velocity among various measuring points;

performing the preceding distance measurement steps at said various measuring points on said surface of said roller to establish numerous surface condition data;

providing a linear member forming said reference distance indicative member relative to which deflection of said reference surface is monitored;

providing an auxiliary ultra-sonic sensor for transmitting auxiliary ultra-sonic waves toward said reference line and receiving the ultra-sonic waves reflected by said reference line defining member;

measuring elapsed time between transmission of said auxiliary ultra-sonic waves and reception of the reflected ultra-sonic waves from said reference line defining member;

deriving the distance between said reference surface and said reference line;

deriving the deflection of said reference surface relative to said reference line of the basis of said derived distance; and modifying said surface condition data on the basis of the derived deflection;

displaying the resultant surface condition data on a display.

53. The process as set forth in claim 52, in which said step for driving said scanning means among various measuring points is formed to shift said scanning means over predetermined distances, and said driving step is performed by causing axial displacement with respect to said roller of said reference surface together with said scanning means.

54. The process as set forth in claim 53, which further comprises a step for correcting derived distance between said reference surface and the surface of said roller for compensating displacement of said reference surface according to said axial displacement thereof.

55. The process as set forth in claim 54, in which there are ten ultrasonic sensors and the corrected distance $Z_i(L)$ at the fully shifted position is derived by the equation $$Z'_i(L) = Z_i(L) + a_1 \times i + b_1$$

where coefficients a and b are derived so as to minimize $\Delta$, defined in the following equation:

$$\Delta = \sum_{i=1}^{9} \{Z'_i(L) - Z_{i+1}(0)\}^2$$

where $Z_i(0)(i=1$ to $10)$ are the measured values at the initial positions.

56. The process as set forth in claim 55, the corrected roller profile indicative distance values $W_i$ at any of the intermediate points shifted through a distance l is derived by modifying the distance value $Z_i(l)$ $(i=1, 2, \ldots 10)$ according to the following equation:

$$W_i = Z_i(l) + a_2 \times i + b_2$$

where $$a_2 = \frac{1}{9}\left\{ -Z_{10}(l) + Z_1(l) + \frac{Q'_9}{2L^2} l(l-L) - \frac{Q'_{10}}{L^2}(l+L)(l-L) - \frac{Q'_3}{2L^2} l(l-L) + \frac{Q'_2}{L^2} l(l-2L) \right\}$$

$$b_2 = \frac{1}{9}\left\{ -10Z_1(l) + Z_{10}(l) + \frac{5Q'_3}{L^2} l(l-L) - \frac{10Q'_2}{L^2} l(l-2L) - \frac{Q'_9}{2L^2} l(l-L) + \frac{Q'_{10}}{L^2}(l+L)(l-L) \right\}$$

$Q_i$ (shown in FIG. 15) $(i=1-11)$ being derived from the following equation:

$$Q_i = Z_i(0): i = 1$$
$$= \{Z'_{i-1}(L) + Z_i(0)\}/2: i = 2-10$$
$$= Z'_{10}(L): i = 11$$

$Q'_i (i=1-11)$ being derived from the following equation:

$$Q'_i = Q_i - \{(Q_{11} - Q_1) \times (i-1)/10 + Q_1\}.$$

57. A system for monitoring a surface condition of an object comprising:

a base having a reference surface, said base movably accommodating an ultra-sonic sensor within a chamber filled with a liquid ultra-sonic wave transmission medium, said ultra-sonic sensor being associated with a driving means which drives said sensor among various measuring points on the surface of said object, said driving means being associated with a position sensor which is adapted to detect the ultra-sonic sensor position relative to said object for controlling positioning of said ultra-sonic sensor;

a support means for supporting said object relative to said reference surface;

a surface scanning means for transmitting ultra-sonic waves towards various measuring points on the surface of said object injecting an ultrasonic wave carrying medium essentially in coaxial relationship with said ultrasonic wave transmitted toward said measuring points, and receiving the ultra-sonic waves reflected from each of said measuring points on said surface of said object, and measuring the reflection elapsed time between transmission of said ultra-sonic waves and reception of the reflected ultra-sonic waves, and deriving from said reflection elapsed time a distance indicative value with respect to each of said measuring points, wherein said surface scanning means comprises an ultra-sonic sensor system comprising a transmitter to transmit ultra-sonic waves toward said target surface at a first controlled timing through a predetermined path, a receiver adapted to receive the ultra-sonic waves reflected by said target surface and to produce a receiver signal when said reflected ultra-sonic waves are received, a timer means for measuring said elapsed time from a first controlled timing to a second timing at which said reflected ultra-sonic waves from said target surface are received, and a processor means for deriving the distance to said target surface, based on said reflection time, and deriving an output value indicative of said distance to said target surface;

a first correction means associated with said surface scanning means for deriving the propagation velocity of said ultra-sonic waves reflected off a surface of said correction means and thus deriving a propagation-velocity-dependent first correction value, said first correction means comprising a reflector member disposed within said path through which said ultra-sonic waves are transmitted, said reflector member allowing part of said ultra-sonic waves to pass therethrough toward said target surface and reflecting the rest of said ultra-sonic waves, and said reflector member being separated from said transmitter through a known distance, said timer means measuring a reference elapsed time between transmission of said ultra-sonic waves and reception of the ultra-sonic waves reflected by said reflector member, and said processor means deriving said propagation velocity of said ultra-sonic waves based on said reference time and said known distance to said reflector member, and deriving said distance indicative value of each of said measuring points based on said propagation velocity and said reflection times;

an arithmetic means connected to said surface scanning means for deriving the distance between each of said measuring points on said surface of of said object and said scanning means; and a display unit connected to said arithmetic means and adapted to display the resultant data derived from the distance derived by said arithmetic means.

* * * * *